United States Patent
Sameshima

(10) Patent No.: US 7,158,453 B2
(45) Date of Patent: Jan. 2, 2007

(54) TRACKING CONTROL SYSTEM AND METHOD FOR TRACKING CONTROL

(75) Inventor: Toshihisa Sameshima, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 545 days.

(21) Appl. No.: 10/654,607

(22) Filed: Sep. 4, 2003

(65) Prior Publication Data
US 2004/0196767 A1 Oct. 7, 2004

(30) Foreign Application Priority Data
Sep. 5, 2002 (JP) ............................ 2002-260283

(51) Int. Cl.
*G11B 7/09* (2006.01)
(52) U.S. Cl. ............................... 369/44.32; 369/53.28
(58) Field of Classification Search ..................... None
See application file for complete search history.

(56) References Cited

U.S. PATENT DOCUMENTS

| | | | |
|---|---|---|---|
| 5,146,443 A | 9/1992 | Iwase et al. | |
| 6,028,826 A | 2/2000 | Yamamoto et al. | |
| 6,567,355 B1 * | 5/2003 | Izumi et al. | 369/44.41 |
| 6,920,093 B1 * | 7/2005 | Nishigaki | 369/44.32 |

FOREIGN PATENT DOCUMENTS

JP         11-175989        7/1999

* cited by examiner

*Primary Examiner*—William Korzuch
*Assistant Examiner*—Joseph Haley
(74) *Attorney, Agent, or Firm*—McDermott Will & Emery LLP

(57) ABSTRACT

A tracking control system for outputting a tracking control signal for an optical pickup including a plurality of light detecting sections each of which converts reflected light of a light beam applied to an optical disk into an electric signal, and outputs the signal, includes: a balance correction amount calculating section for obtaining, as a balance correction amount, a value by which a differential phase tracking error signal based on each output of the light detecting sections should be shifted in accordance with a direct-current component of a differential amplitude tracking error signal based on each output of the light detecting sections such that a direct-current component of the differential phase tracking error signal approaches a given reference potential; a balance changing section for shifting the differential phase tracking error signal in accordance with the balance correction amount; and a tracking control section for generating the tracking control signal in accordance with the differential phase tracking error signal after the shift.

13 Claims, 20 Drawing Sheets

*(PRIOR ART)*
FIG. 18A
*(PRIOR ART)*
FIG. 18B
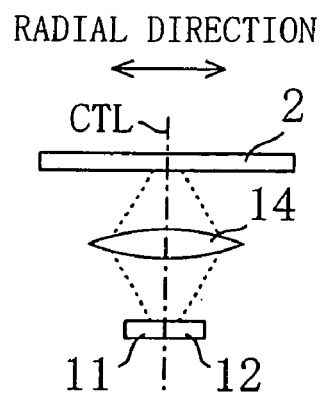
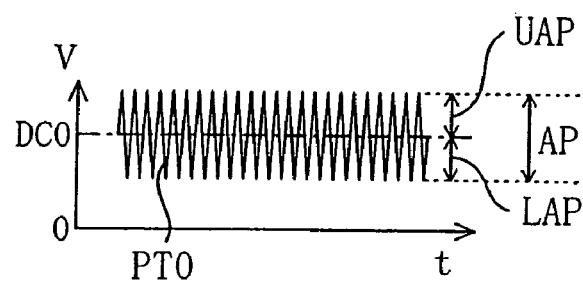
*(PRIOR ART)*
FIG. 18C
*(PRIOR ART)*
FIG. 18D
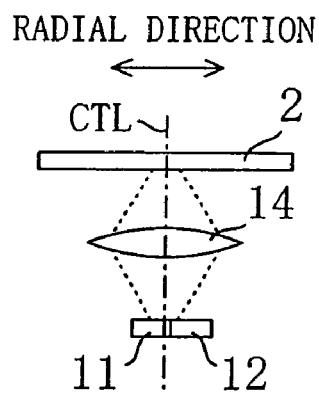
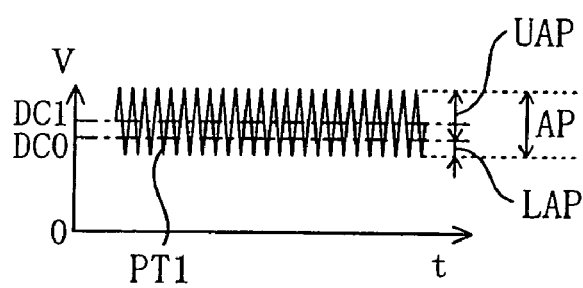

TRACKING CONTROL SYSTEM AND METHOD FOR TRACKING CONTROL

BACKGROUND OF THE INVENTION

The present invention relates to a tracking control technology used in, for example, optical disk apparatus.

Optical disk apparatus performs tracking control for allowing a light beam to follow a track on an optical disk in accordance with a tracking error signal. A differential phase detection method is a method for the tracking control. If the center of a photodetector for converting light reflected from the optical disk into an electric signal is not on the optical axis of a lens for focusing the light beam (i.e., in the case of a lens shift), the DC level (direct current component) of a differential phase tracking error signal might deviate from a reference value or the amplitude of the differential phase tracking error signal might be small.

A tracking control system for generating a differential phase tracking error signal without being affected by such a lens shift is disclosed in Japanese Laid-Open Publication No. 11-175989. Hereinafter, an example of the known tracking control system will be described.

FIG. 17 is a block diagram showing an example of a configuration of the known tracking control system. In FIG. 17, each light receiving sections 11 and 12 provided on an optical pickup 10 converts a light spot SP, which is light reflected from an optical disk, into an electric signal and outputs the signal. V/I converting sections 21 and 22 convert the respective voltage signals output from the light receiving sections 11 and 12 into current signals, and output the signals to a differential phase tracking error signal generating section (differential phase TE generating section) 31. The differential phase TE generating section 31 obtains and outputs a phase difference between signals input thereto. An amplitude gain setting section 932 multiplies the output of the differential phase TE generating signal 31 by a constant which can be set at an arbitrary value.

A CPU 948 receives an output of a balance changing section 933 by way of a balance correcting section 934 and outputs a balance value for equalizing the upper part of the amplitude of the signal with the lower part thereof with respect to a reference value. The balance changing section 933 shifts the output of the amplitude gain setting section 932 in accordance with the balance value, i.e., changes the balance, thereby producing an output.

V/I converting sections 23 and 24 convert respective voltage signals output from the light receiving sections 11 and 12 into current signals and output the current signals to a differential amplitude tracking error signal generating section (differential amplitude TE generating section) 41. The differential amplitude TE generating section 41 performs a subtraction on the input signals and outputs the result. An amplitude gain setting section 942 multiplies the output of the differential amplitude TE generating section 41 by a constant which can be set at an arbitrary value and outputs the result.

An adding section 939 adds the output of the balance changing section 933 to the output of the amplitude gain setting section 942 and outputs the sum. An A/D converting section 34 converts the output of the adding section 939 into a digital value and outputs the digital value to a tracking control section 58. The tracking control section 58 generates a tracking control signal for performing tracking control of the optical pickup 10 in accordance with the output of the A/D converting section 34, and outputs the signal to a tracking drive section 59. The tracking drive section 59 performs tracking control, i.e., controls the position of the optical pickup 10 in accordance with the tracking control signal such that a light beam emitted from the optical pickup 10 follows a track on the optical disk.

An A/D converting section 44 converts the output of the amplitude gain setting section 942 into a digital value and outputs the digital value as a differential amplitude tracking error signal DTE. The differential amplitude tracking error signal DTE is used for control other than the tracking control.

The CPU 948 performs focus control for keeping the distance between the optical pickup 10 and the optical disk 2 substantially constant, using a focus drive offset section 71, a focus control section 72 and a focus driving section 73. If a defect on the optical disk is detected based on a signal output from a reproduced signal detecting section 15 on the optical pickup 10, the tracking control section 58 maintains the tracking control.

FIG. 18A is a cross-sectional view showing an orientation of the lens 14 and the light receiving sections 11 and 12, in an ideal case. FIG. 18B is a graph showing a waveform of a differential phase tracking error signal PT0 in the case shown in FIG. 18A. FIG. 18C is a cross-sectional view showing an orientation of the lens 14 and the light receiving sections 11 and 12 in the case where the position of the light receiving sections 11 and 12 shifts with respect to the lens 14. FIG. 18D is a graph showing a waveform of a differential phase tracking error signal PT1 in the case shown in FIG. 18C.

The optical disk 2 reflects a light beam applied thereto. Each of the light receiving sections 11 and 12 receives the reflected light and converts the light into an electric signal. In this case, it is assumed that focus control for keeping the distance between the optical disk 2 and the lens 14 constant is performed.

In the case shown in FIG. 18A, the boundary between the light receiving sections 11 and 12 is located on the optical axis CTL of the lens 14 for focusing the light beam. In this case, as shown in FIG. 18B, the differential phase tracking error signal PT0 is a signal with an amplitude AP whose center is at a reference potential DC0. An upper-part amplitude UAP which is a difference between the reference potential DC0 and the upper limit of the amplitude AP is substantially equal to a lower-part amplitude LAP which is a difference between the reference potential DC0 and the lower limit of the amplitude AP. Therefore, the differential phase tracking error signal PT0 is an ideal signal.

In the case shown in FIG. 18C, the light receiving sections 11 and 12 shift in the radial direction of the optical disk 2, and the boundary between the light receiving sections 11 and 12 is not on the optical axis CTL of the lens 14 for focusing the light beam. That is to say, a lens shift is present. In this case, as shown in FIG. 18D, a differential phase tracking error signal PT1 is smaller than in the case where the amplitude AP is in the state shown in FIG. 18B and the center of the amplitude AP is at a potential DC1 which deviates from the reference potential DC0. In addition, the difference between the upper-part amplitude UAP and the lower-part amplitude LAP with respect to the reference potential DC0 is enlarged. Therefore, the differential phase tracking error signal PT1 is a signal greatly lacking in balance.

The change in balance of a differential phase tracking error signal in the known tracking control system will be described. It is herein assumed that focus control is performed in this case. FIG. 18D shows a differential phase tracking error signal PT1 before a balance correction.

FIG. 19A is a graph showing a DC level DDC of a differential amplitude tracking error signal DTE in the case shown in FIG. 18C. The DC level DDC of the differential amplitude tracking error signal DTE which is a difference between a signal obtained from the light receiving section 11 and a signal obtained from the light receiving section 12 shifts from the reference potential DC0 in accordance with a distance for which the light receiving sections 11 and 12 deviate from the optical axis CTL of the lens 14 in the radial direction of the optical disk 2.

FIG. 19B is a graph showing a differential phase tracking error signal PT2 in the case of a balance change. If the differential phase tracking error signal PT1 is shifted by adding the difference between the DC level DDC of the differential amplitude tracking error signal DTE and the reference potential DC0 to the differential phase tracking error signal PT1, the upper-part amplitude UAP and the lower-part amplitude LAP can be made equal to each other with respect to the reference potential DC0.

FIG. 19C is a graph showing a differential phase tracking error signal PT3 in the case of correcting the balance and the amplitude. In the case shown in FIG. 18C, since the amplitude AP of the differential phase tracking error signal PT1 is smaller than in the case shown in FIG. 18A, the balance is corrected as shown in FIG. 19B, and then the amplitude gain is changed so as to increase the amplitude AP. Then, an ideal differential phase tracking error signal PT3 is obtained as shown in FIG. 19C.

Next, the case where the lens 14 for focusing a light beam has an aberration will be described. In this case, it is also assumed that focus control is performed. FIG. 20A is an illustration showing a positional relationship between the light spot SP and the light receiving sections 11 and 12 in the case of the absence of both an aberration of the lens 14 and a lens shift. If there is no lens aberration, the light spot SP is in the shape of an approximately perfect circle. If the light spot SP is on the boundary between the light receiving sections 11 and 12, the differential phase tracking error signal is an ideal signal having an upper-part amplitude UAP and a lower-part amplitude LAP which are equal to each other with respect to the reference potential DC0 as in the case shown in FIG. 18B.

FIG. 20B is an illustration showing a positional relationship between the light spot SP and the light receiving sections 11 and 12 in the case where the lens 14 has an aberration and exhibits no lens shift. In the case where the lens 14 for focusing a light beam has an aberration, a light spot SPL is in the shape of an ellipse which is inclined about 45 degrees, for example, toward the boundary between the light receiving sections 11 and 12. In this case, as in the case shown in FIG. 18D, the DC level of the differential phase tracking error signal deviates from the reference potential DC0 and there is a difference between the upper-part amplitude UAP and the lower-part amplitude LAP with respect to the reference potential DC0, and the amplitude AP is small.

FIG. 20C is an illustration showing a positional relationship between the light spot SPL and the light receiving sections 11 and 12 in the case where the lens 14 has an aberration and exhibits a lens shift. FIG. 20D is a graph showing a differential phase tracking error signal PT5 in the case shown in FIG. 20C. The differential phase tracking error signal PT5 in the case of the presence of both of the lens aberration and the lens shift has a DC level DC5 greatly deviating from the reference potential DC0, so that the difference between the upper-part amplitude UAP and the lower-part amplitude LAP with respect to the reference potential DC0 is large and the amplitude AP is small.

FIG. 20E is a graph showing a signal (PT6) when the differential phase tracking error signal PT5 in the case shown in FIG. 20C is shifted in the same manner as in FIG. 19B. In the case of a lens aberration, since the DC level DC5 of the differential phase tracking error signal PT5 greatly deviates from the reference potential DC0, a DC level DC6 of the differential phase tracking error signal PT6 does not coincide with the reference potential DC0 even after the shift.

FIG. 20F is a graph showing a signal (PT7) when the amplitude of the differential phase tracking error signal PT5 in the case shown in FIG. 20C is corrected in the same manner as in FIG. 19C. As shown in the drawing, even the amplitude is further changed, a DC level DC7 of the differential phase tracking error signal PT7 does not coincide with the reference potential DC0.

As described above, in the known tracking control system, if the aberrations of lenses for focusing a light beam vary among the lenses, a potential deviation of the DC level occurring in a differential phase tracking error signal cannot be corrected sufficiently.

In addition, a circuit for adding a differential phase tracking error signal to a differential amplitude tracking error signal is needed, and a circuit for multiplying a gain is also needed so as to change the amplitude of the differential amplitude tracking error signal arbitrarily. As a result, the cost is high.

Furthermore, when a light beam passes on a defect present on an optical disk or when tracking control is performed again after seek operation for transferring a light beam to a track on the optical disk, for example, an unnecessary signal component is mixed into a differential amplitude tracking signal to have a harmful influence on a differential phase tracking error signal. As a result, the tracking control is unstable.

SUMMARY OF THE INVENTION

It is therefore an object of the present invention to provide a tracking control system for performing stable tracking control with a simple circuit.

It is another object of the present invention to provide a tracking control system capable of performing stable control even in the case where a lens has an aberration.

Specifically, an inventive tracking control system is a system for outputting a tracking control signal for performing tracking control of an optical pickup including a plurality of light detecting sections each of which detects, via a lens, reflected light of a light beam applied to an optical disk, converts the detected light into an electric signal, and outputs the signal, and the tracking control system includes: a differential phase tracking error signal generating section for generating and outputting a differential phase tracking error signal based on a difference in phase between signals output from the plurality of light detecting sections; a differential amplitude tracking error signal generating section for generating and outputting a differential amplitude tracking error signal based on a difference in value between signals output from the plurality of light detecting sections; a balance correction amount calculating section for obtaining a direct-current component of the differential amplitude tracking error signal, and obtaining and outputting, as a balance correction amount, a value by which the differential phase tracking error signal should be shifted in accordance with the direct-current component of the differential amplitude tracking error signal such that a direct-current component of the differential phase tracking error signal approaches a given reference potential; a balance changing section for shifting the differential phase tracking error signal in accordance with the balance correction amount, thereby outputting the shifted signal as a differential phase tracking error signal after balance change; and a tracking control section for generating and outputting the tracking control signal in accordance with the differential phase tracking error signal after balance change.

With this configuration, in the case where the optical axis of the lens for focusing the light beam deviates from the boundary between the plurality of light receiving sections for detecting light reflected from the optical disk, or in the case where the lens has an aberration, even if the direct-current component of the differential phase tracking error signal deviates from the referential potential, it is possible to shift the signal so that the direct-current component of the signal approaches the reference potential. As a result, stable tracking control can be performed.

In the tracking control system, the balance correction amount calculating section may include: a threshold value storing section for storing a threshold value and a balance value corresponding to the threshold value; a comparing section for comparing the direct-current component of the differential amplitude tracking error signal with the threshold value, and outputting the balance value in accordance with a result of the comparison; and a balance correcting section for outputting the balance correction amount in accordance with the balance value output from the comparing section.

With this configuration, it is possible to shift the differential phase tracking error signal so that the direct-current component thereof approaches the referential potential, using a simple circuit.

In the inventive tracking control system, the balance correction amount calculating section may include: a program storing section for storing a program in which a threshold value and a balance value corresponding to the threshold value are set; a CPU for executing the program, comparing the direct-current component of the differential amplitude tracking error signal with the threshold value, and outputting the balance value in accordance with a result of the comparison; and a balance correcting section for outputting the balance correction amount in accordance with the balance value output from the CPU.

With this configuration, the settings of the threshold value and the balance value can be changed easily.

In the tracking control system, the tracking control section may output the tracking control signal such that the optical pickup is moved in accordance with a drive value shift signal output from the balance correction amount calculating section, and the balance correction amount calculating section may include: a program storing section for storing a program; a CPU for executing the program, outputting the drive value shift signal for giving an instruction to move the optical pickup to a first tracking position closer to the outer edge of the optical disk than a position under tracking control and to a second tracking position closer to the inner edge of the optical disk than the position under tracking control, obtaining a value, as a conversion factor, by dividing a difference in the direct-current component of the differential phase tracking error signal between when the optical pickup is at the first tracking position and when the optical pickup is at the second tracking position by a difference in the direct-current component of the differential amplitude tracking error signal between when the optical pickup is at the first tracking position and when the optical pickup is at the second tracking position, and obtaining a value according to a product of the direct-current component of the differential amplitude tracking error signal and the conversion factor, thereby outputting the obtained value as a balance value; and a balance correction section for outputting the balance correction amount in accordance with the balance value.

In this configuration, the conversion factor obtained with respect to each optical pickup is used, it is unnecessary to compare the direct-current component of the differential amplitude tracking error signal with a large number of threshold values.

The CPU may obtain and output the balance value every time the direct-current component of the differential amplitude tracking error signal reaches a given threshold value.

The tracking control system may further include an A/D converting section for performing an A/D conversion of the differential amplitude tracking error signal, wherein the CPU may obtain and output the balance value every time after the A/D converting section has performed sampling a given number of times.

The tracking control system may further include a focus driving section for driving the lens in accordance with a focus shift value, wherein the CPU may output the focus shift value for giving an instruction to move the lens to a first focus position at a distance from the optical disk smaller than an in-focus position and to a second focus position at a distance from the optical disk larger than the in-focus position, obtain the direct-current component of the differential phase tracking error signal at a position between the first and second focus positions as a balance value required due to an influence of a lens aberration, based on the direct-current components of the differential phase tracking error signal when the lens is at the first and second focus positions, respectively multiply the product and the balance value required due to the influence of the lens aberration by respective given coefficients, and then sum these multiplication results, thereby outputting the sum as the balance value.

With this configuration, even if the lens has an aberration, it is possible to correct a potential deviation occurring in the direct-current component of the differential phase tracking error signal.

The CPU may respectively multiply the product and the balance value required due to the influence of the lens aberration by one-half and then sum these multiplication results, thereby outputting the sum as the balance value.

The balance correction amount calculating section may obtain and output the balance correction amount by multiplying the conversion factor by a given constant during seek operation, and the tracking control section may output the tracking control signal in accordance with the differential phase tracking error signal after balance change obtained during the seek operation, after the seek operation has been completed.

With this configuration, tracking control after the completion of seek operation can be performed with stability.

The tracking control system may further include a focus driving section for driving the lens in accordance with a focus shift value, wherein the balance correction amount calculating section may include: a program storing section for storing a program; a CPU for executing the program, outputting the focus shift value for giving an instruction to move the lens to a first focus position at a distance from the optical disk smaller than an in-focus position and to a second focus position at a distance from the optical disk larger than the in-focus position, and obtaining the direct-current component of the differential phase tracking error signal at a position between the first and second focus positions based on the direct-current components of the differential phase tracking error signal when the lens is at the first and second focus positions, thereby outputting a value corresponding to the obtained direct-current component as a balance value; and a balance correction section for outputting the balance correction amount in accordance with the balance value.

In the tracking control system, the balance correction amount calculating section may detect the direct-current component of the differential amplitude tracking error signal during seek operation, and obtain and output the balance correction amount in accordance with the detected direct-current component of the differential amplitude tracking error signal, and the tracking control section may output the tracking control signal in accordance with the differential phase tracking error signal after balance change obtained during the seek operation, after the seek operation has been completed.

The tracking control system may further include an amplitude level changing section for changing an amplitude of the differential phase tracking error signal in accordance with a gain input, and outputting the obtained signal to the balance changing section, wherein the balance correction amount calculating section may output the gain in accordance with an amplitude of the differential phase tracking error signal after balance change output from the balance changing section such that the amplitude has a given magnitude.

With this configuration, a differential phase tracking error signal having a constant amplitude can be generated, resulting in stable tracking control.

The tracking control system may further include a defect detecting section for detecting a defect on the optical disk based on a reproduced signal detected by the optical pickup, and outputting a defect detection signal indicating whether there is a defect or not, wherein the balance correction amount calculating section may set the balance correction amount at a given value when the defect detection signal indicates the presence of a defect.

The tracking control system may further include a defect detecting section for detecting a defect on the optical disk based on a reproduced signal detected by the optical pickup, and outputting a defect detection signal indicating the presence of a defect, wherein the balance correction amount calculating section may hold the balance correction amount at a value before the detection of a defect when the defect detection signal indicates the presence of the defect.

With this configuration, even if a defect is present on the optical disk, stable tracking control can be performed.

The tracking control system may include a plurality of semiconductor integrated circuits, wherein one of the plurality of semiconductor integrated circuits may include the differential phase tracking error signal generating section, the differential amplitude tracking error signal generating section and the balance changing section, and another one of the plurality of semiconductor integrated circuits may include the balance correction amount calculating section and the tracking control section.

With this configuration, stable tracking control can be performed with low cost.

BRIEF DESCRIPTION OF THE DRAWINGS

FIG. 18A is a cross-sectional view showing an orientation of a lens and a light receiving sections in an ideal case.

FIG. 18B is a graph showing a waveform of a differential phase tracking error signal in the case shown in FIG. 18A.

FIG. 18C is a cross-sectional view showing an orientation of a lens and light receiving sections in the case where the position of the light receiving sections deviates with respect to the lens.

FIG. 18D is a graph showing a waveform of a differential phase tracking error signal in the case shown in FIG. 18C.

DETAILED DESCRIPTION OF THE INVENTION

Hereinafter, embodiments of the present invention will be described with reference to the drawings.

Embodiment 1

Figure 1:
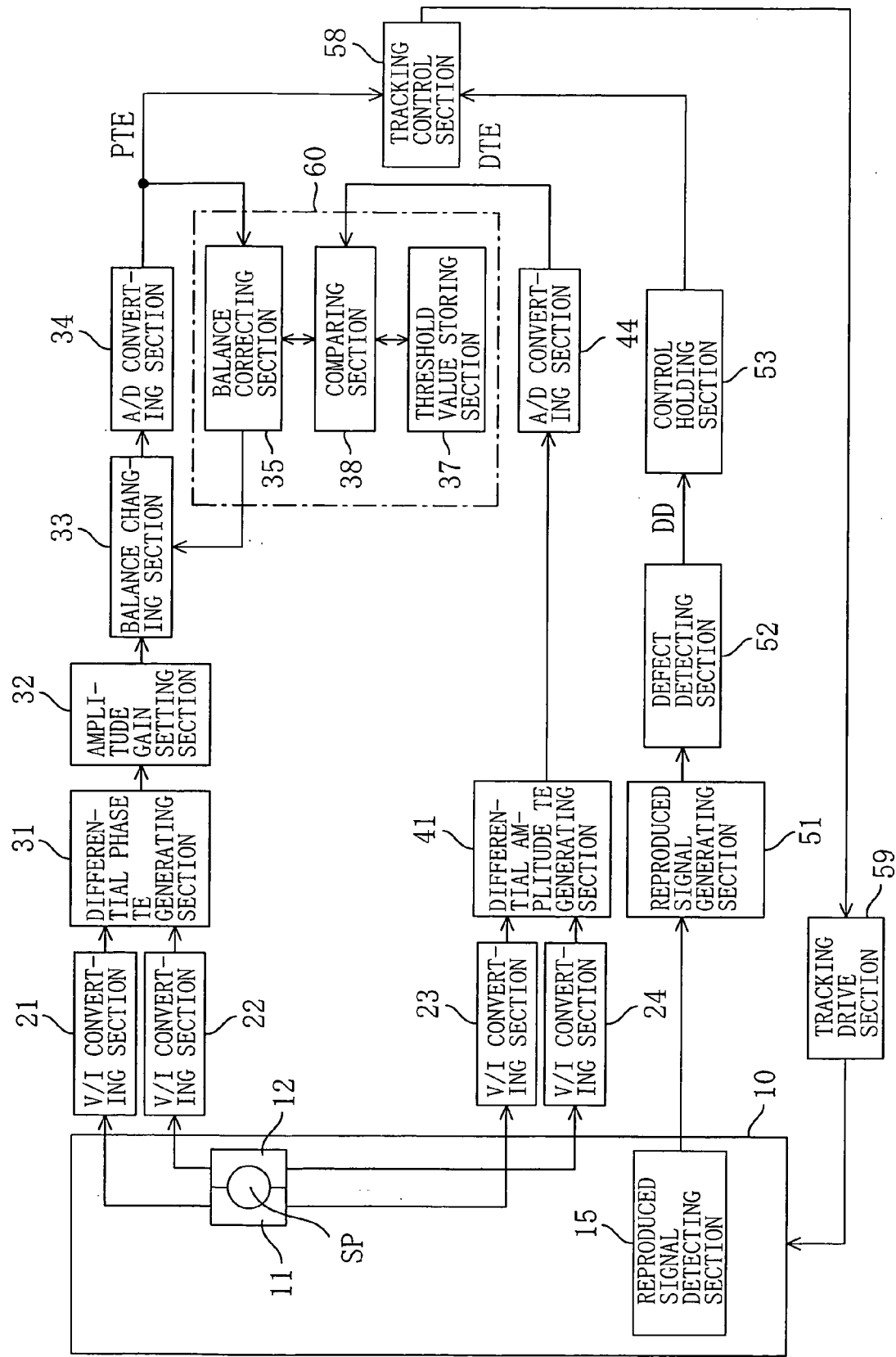
FIG. 1 is a block diagram showing an example of a configuration of a tracking control system according to a first embodiment of the present invention.

FIG. 1 is a block diagram showing an example of a configuration of a tracking control system according to a first embodiment of the present invention. The tracking control system shown in FIG. 1 includes: V/I converting sections 21, 22, 23 and 24; a differential phase tracking error signal generating section (hereinafter, referred to as a differential phase TE generating section) 31; an amplitude gain setting section 32; a balance changing section 33; A/D converting sections 34 and 44; a balance correcting section 35; a threshold value storing section 37; a comparing section 38; a differential amplitude tracking error signal generating section (hereinafter, referred to as a differential amplitude TE generating section) 41; a reproduced signal generating section 51; a defect detecting section 52; a control holding section 53; and a tracking control section 58. The balance correcting section 35, the threshold value storing section 37 and the comparing section 38 together constitute a balance correction amount calculating section 60.

The tracking control system shown in FIG. 1 further includes: an optical pickup 10 as a target of tracking control; and a tracking drive section 59 for driving the optical pickup 10. Hereinafter, a tracking error signal is also referred to as TE.

Figure 2:
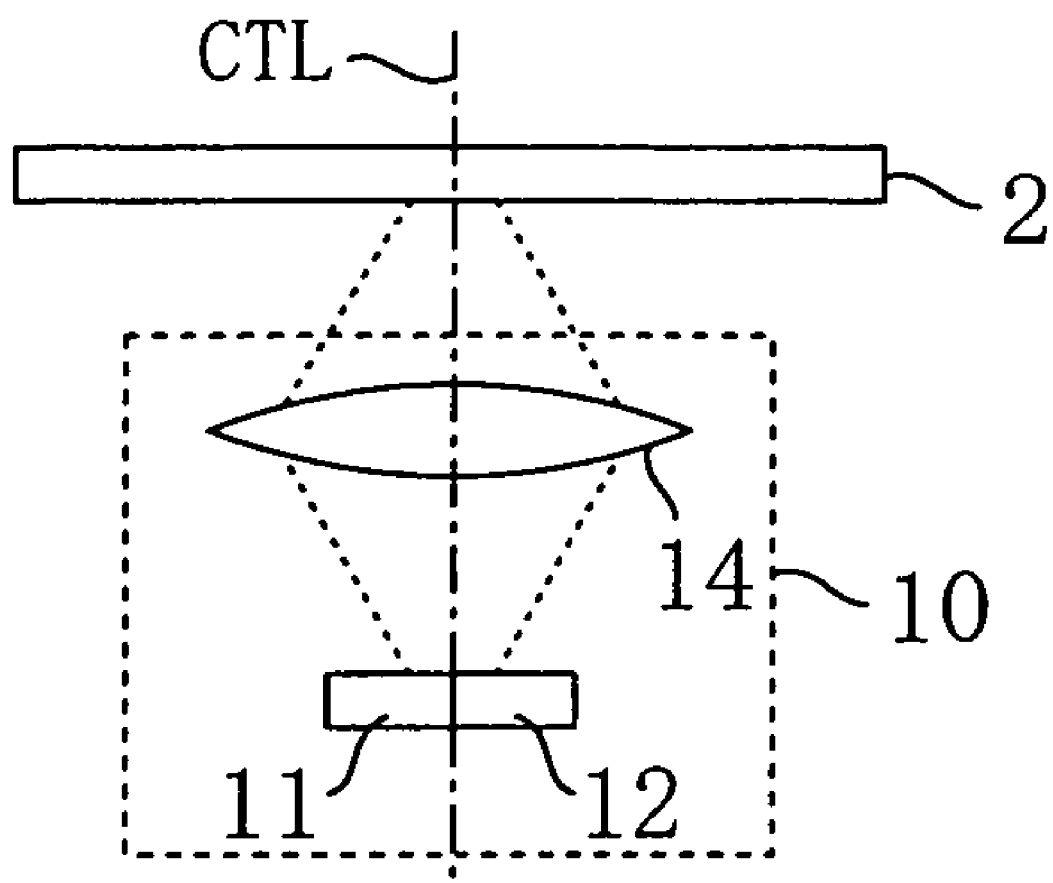
FIG. 2 is a cross-sectional view showing an optical pickup and an optical disk shown in FIG. 1.

FIG. 2 is a cross-sectional view showing an optical pickup 10 and an optical disk 2 shown in FIG. 1. As shown in FIGS. 1 and 2, the optical pickup 10 includes: light receiving sections 11 and 12; a lens 14; and a reproduced signal detecting section 15. Though not shown, the optical pickup 10 also includes a light emitting section for applying light to the optical disk 2. The optical disk 2 reflects a light beam emitted from the light emitting section, and the reflected light reaches the light receiving sections 11 and 12 via the lens 14. A region irradiated with the reflected light is called a light spot SP. The direction of the boundary between the light receiving sections 11 and 12 substantially coincides with the circumferential direction of the optical disk 2. FIG. 2 shows an ideal case where the boundary between the light receiving sections 11 and 12 is located on the optical axis CTL of the lens 14.

Hereinafter, it is assumed that a DC level of a signal, i.e., a direct component of the signal, represents the average of the maximum value and the minimum value of a signal within a predetermined period. Alternatively, the DC level of the signal may be the average value of a signal within a predetermined period.

In FIG. 1, the light receiving sections 11 and 12 convert light reflected from the optical disk 2 into respective electric signals, and are assumed to output voltage signals in this case. The V/I converting sections 21 and 22 convert the voltage signals output from the light receiving sections 11 and 12 into respective current signals and output the current signals to the differential phase TE generating section 31. The V/I converting sections 23 and 24 convert the voltage signals output from the light receiving sections 11 and 12 into respective current signals and output the current signals to the differential amplitude TE generating section 41.

The differential phase TE generating section 31 detects a phase difference between the two input signals and generates a differential phase tracking error signal by a differential phase detection method based on the detected phase difference, thereby outputting the signal to the amplitude gain setting section 32. The amplitude gain setting section 32 multiplies the differential phase tracking error signal by a constant which can be set at an arbitrary value and outputs a result of the multiplication to the balance changing section 33.

The balance changing section 33 shifts the output of the amplitude gain setting section 32 in accordance with a balance correction amount output from the balance correcting section 35 and produces an output to the A/D converting section 34. The A/D converting section 34 converts the output of the balance changing section 33 into a digital value and outputs the digitized differential phase tracking error signal PTE to the balance correcting section 35 and the tracking control section 58.

As described above, the procedure in which the balance changing section 33 shifts the output of the amplitude gain setting section 32 to change an offset which is a direct-current potential deviation steadily occurring between the DC level PTD1 of the differential phase tracking error signal PTE and a reference potential, is referred to as a balance change. As a result of the balance change performed by the balance changing section 33, the difference between the upper-part amplitude and the lower-part amplitude of the differential phase tracking error signal PTE with respect to the reference potential becomes small. That is to say, it is possible to make the DC level PTD1 of the differential phase tracking error signal PTE come closer to the reference potential. In this case, the upper-part amplitude is a difference between the reference potential and the maximum value of the signal, and the lower-part amplitude is a difference between the reference value and the minimum value of the signal.

The tracking control section 58 generates a tracking control signal for performing tracking control of the optical pickup 10 in accordance with the differential phase tracking error signal PTE, and outputs the signal to the tracking drive section 59. The tracking drive section 59 performs tracking control of the optical pickup 10 in accordance with the tracking control signal. Specifically, the tracking drive section 59 controls the position of the optical pickup 10 such that a light beam applied to the optical disk 2 follows a track on the optical disk 2.

The differential amplitude TE generating section 41 detects a difference between the two input signals, i.e., a potential difference, and generates a differential amplitude tracking error signal based on the detected difference, thereby outputting the signal to the A/D converting section 44. The A/D converting section 44 converts the differential amplitude tracking error signal into a digital value and outputs the digitized differential amplitude tracking error signal DTE to the comparing section 38. The differential amplitude tracking error signal DTE is also used for control other than the tracking control, but detailed description thereof is omitted herein.

A DC level PTD1 of the differential phase tracking error signal PTE takes a value in accordance with the distance of deviation of the light beam applied to the optical disk 2 from the track on the optical disk 2 and the distance of deviation of the optical axis CTL of the lens 14 from the boundary between the light receiving sections 11 and 12. The DC level DTD of the differential amplitude tracking error signal DTE indicates the amount of a shift between the optical axis CTL of the lens 14 and the boundary between the light detecting sections 11 and 12.

The threshold value storing section 37 stores at least one threshold value and a balance value corresponding to the threshold value. The threshold value can be set at an arbitrary value. The comparing section 38 obtains a DC level DTD of the differential amplitude tracking error signal DTE output from the A/D converting section 44 and compares the obtained DC level DTD with the threshold value stored in the threshold value storing section 37. If the DC level DTD reaches the threshold value, the comparing section 38 reads the balance value corresponding to the threshold value from the threshold value storing section 37, and outputs the balance value to the balance correcting section 35.

The balance correcting section 35 obtains a value by which the differential phase tracking error signal PTE should be shifted as a balance correction amount in accordance with the balance value such that the DC level PTD1 of the differential phase tracking error signal PTE approaches the reference potential, and outputs the obtained value to the balance changing section 33. For example, the balance correcting section 35 multiplies the balance value by a given coefficient, and outputs the obtained value as a balance correction amount. In addition, the balance correcting section 35 outputs the differential phase tracking error signal PTE to the comparing section 38.

The reproduced signal detecting section 15 on the optical pickup 10 has a light receiving section to detect a signal indicating information recorded on the optical disk 2 and to produce an output to the reproduced signal generating section 51. The reproduced signal generating section 51 generates a reproduced signal based on the output of the reproduced signal detecting section 15 and outputs the reproduced signal to the defect detecting section 52. The defect detecting section 52 detects whether or not a defect is present on the optical disk, using the signal output from the reproduced signal generating section 51, and outputs a defect detection signal DD indicating a result of the detection to the control holding section 53. If the defect detection signal DD indicates the detection of a defect, the control holding section 53 instructs the tracking control section 58 to hold the current tracking control state.

Figure 3:
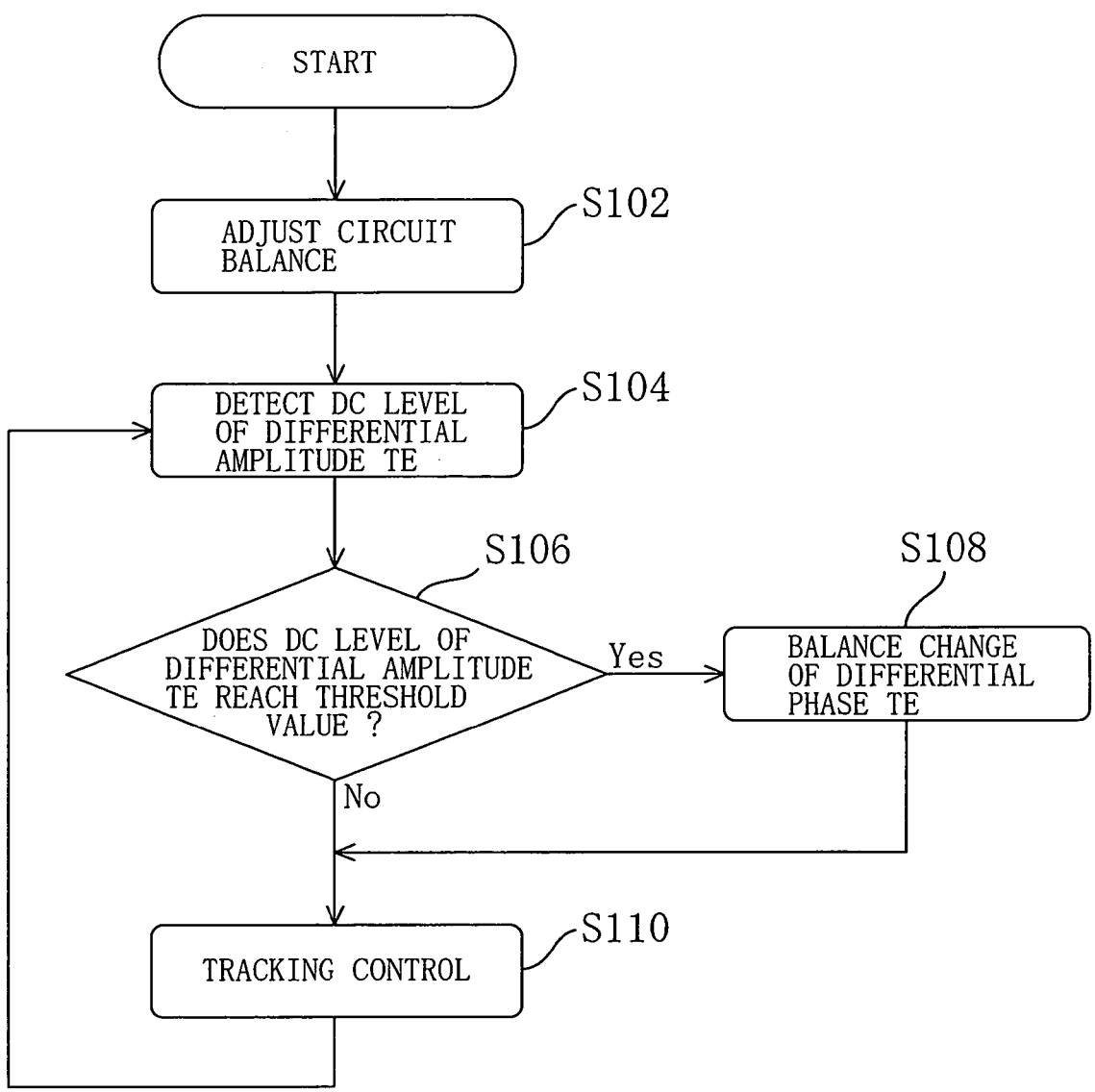
FIG. 3 is a flowchart showing generation of a differential phase tracking error signal in the first embodiment.
Figure 4:
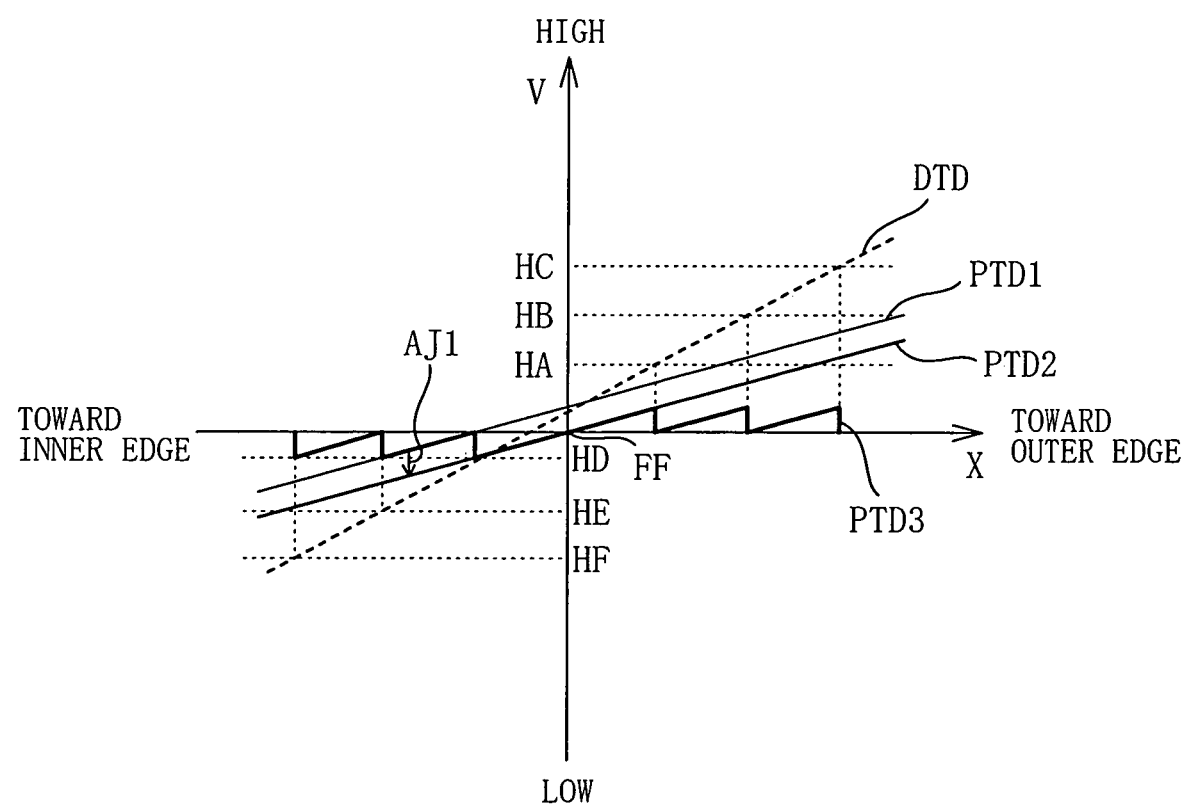
FIG. 4 is a graph for describing a balance change of the differential phase tracking error signal in the first embodiment.

FIG. 3 is a flowchart showing generation of a differential phase tracking error signal PTE in the first embodiment. FIG. 4 is a graph for describing a balance change of the differential phase tracking error signal PTE in the first embodiment.

In FIG. 4, the abscissa represents the lens shift amount X indicating the position of the boundary between the light receiving sections 11 and 12 with respect to the optical axis of the lens 14. The lens shift amount X increases as the lens 14 is closer to the outer edge of the optical disk as compared to the light receiving sections 11 and 12, while decreasing as the lens is closer to the inner edge thereof. The intersection points with the ordinate represent the case where the light spot SP is on the track. The ordinate represents the potential.

The flow shown in FIG. 3 will be described with reference to FIG. 4. It is assumed that at the start of the flow in FIG. 3, focus control is performed such that the distance between the lens 14 for focusing the light beam and the optical disk 2 is substantially constant.

In step S102, an initial circuit balance adjustment is performed. Specifically, the comparing section 38 obtains, based on the output of the A/D converting section 34, a balance value so as to eliminate a potential deviation of the DC level steadily output from sections such as the differential phase TE generating section 31, the amplitude gain setting section 32 and the balance changing section 33 regarding generation of the differential phase tracking error signal PTE, and outputs the balance value to the balance correcting section 35. The comparing section 38 stores the balance value at this time as an initial value. The balance changing section 33 shifts the output of the amplitude gain setting section 32 in accordance with the output of the balance correcting section 35 so as to equalize the upper-part of the differential phase tracking error signal PTE and the lower-part thereof.

By performing such an initial circuit balance adjustment, the DC level PTD1 of the differential phase tracking error signal PTE before the circuit balance adjustment is shifted by a voltage AJ1 to be a DC level PTD2 of the differential phase tracking error signal PTE after the circuit balance adjustment. Then, if the optical axis of the lens 14 does not deviate from the boundary between the light receiving sections 11 and 12, the DC level PTD2 coincides with the reference potential DC0 of the differential phase tracking error signal PTE. The origin point FF of the graph shown in FIG. 4 corresponds to the reference potential DC0, and the graph of the DC level PTD2 passes through the origin point FF.

In step S104, the comparing section 38 detects the DC level DTD of the differential amplitude tracking error signal DTE. In step S106, the comparing section 38 compares the DC level DTD of the differential amplitude tracking error signal DTE and each threshold value stored in the threshold value storing section 37. The threshold value storing section 37 stores threshold values HA, HB, HC, HD, HE and HF and the balance values corresponding to the respective threshold values.

More specifically, the following process is performed in step S106. That is to say, in the case where the DC level DTD is higher than or equal to the reference potential DC0, when the comparing section 38 determines that the DC level DTD is lower than any of the threshold values HA, HB and HC which are larger than or equal to the reference potential DC0, the process proceeds to step S110. In the other cases, i.e., the case where the DC level DTD reaches one of the threshold values HA, HB and HC, the process proceeds to step S108. In the case where the DC level DTD is lower than the reference potential DC0, when the comparing section 38 determines that the DC level DTD is higher than any of the threshold values HD, HE, HF which are smaller than the reference potential DC0, the process proceeds to step S110. In the other cases, i.e., the DC level DTD reaches one of the threshold values HD, HE and HF, the process proceeds to step S108.

In step S108, if the DC level DTD is higher than or equal to the reference potential DC0, the comparing section 38 reads the balance value corresponding to the largest one of the threshold values HA, HB and HC larger than or equal to the reference potential DC0 that is lower than or equal to the DC level DTD from the threshold value storing section 37, thereby outputting the balance value to the balance correcting section 35. If the DC level DTD is lower than the reference potential DC0, the comparing section 38 reads, from the threshold value storing section 37, the balance value corresponding to the smallest one of the threshold values HD, HE and HF smaller than the reference potential DC0 that is higher than the DC level DTD, thereby outputting the balance value to the balance correcting section 35.

The balance correcting section 35 calculates a balance correction amount in accordance with the balance value and outputs the result to the balance changing section 33. The balance changing section 33 performs a balance change of the differential phase tracking error signal PTE. That is to say, the balance changing section 33 shifts the output of the amplitude gain setting section 32 in accordance with the balance correction amount. Then, as shown in FIG. 4, the DC level PTD3 after the balance change of the differential phase tracking error signal PTE is obtained.

In step S110, the tracking control section 58 outputs a tracking control signal in accordance with the differential phase tracking error signal PTE, and the tracking drive section 59 performs tracking control using the output tracking control signal. Then, the process returns to step S104.

In this manner, the tracking control system shown in FIG. 1 can reduce the difference between the DC level PTD3 of the differential phase tracking error signal PTE and the reference potential DC0 to a small value, so that stable tracking control can be performed.

Embodiment 2

Figure 5:
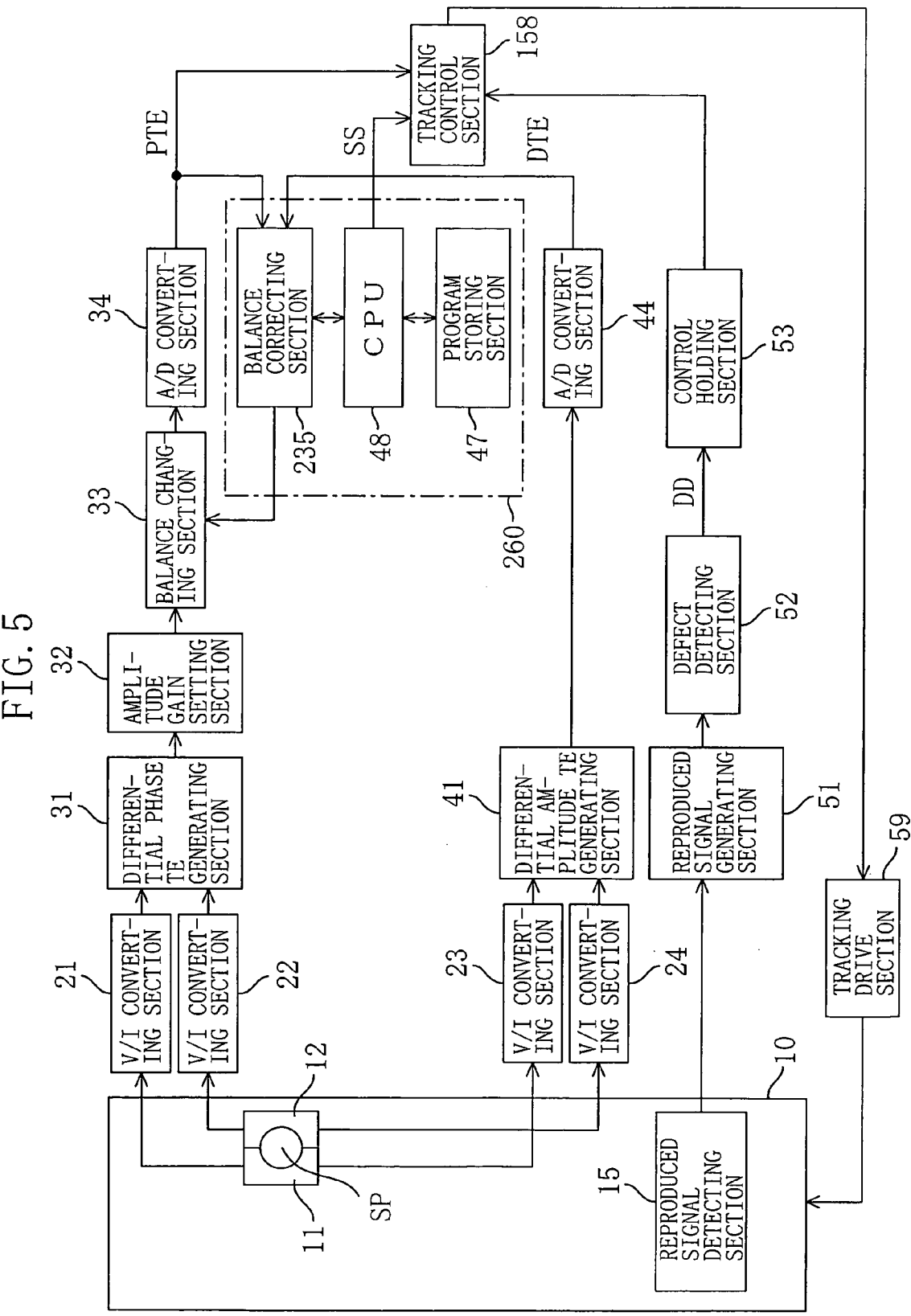
FIG. 5 is a block diagram showing an example of a configuration of a tracking control system according to a second embodiment of the present invention.

FIG. 5 is a block diagram showing an example of a configuration of a tracking control system according to a second embodiment of the present invention. The tracking control system shown in FIG. 5 includes: a program storing section 47; a CPU 48; a balance correcting section 235; and a tracking control section 158, instead of the threshold value storing section 37, comparing section 38, balance correcting section 35, and tracking control section 58, respectively, in the tracking control system shown in FIG. 1. The program storing section 47, the CPU 48 and the balance correcting section 235 together constitute a balance correction amount calculating section 260. The other components are the same as the counterparts already described with reference to FIG. 1 and those like components are identified by the same reference numerals. Thus, the description thereof will be omitted herein.

In FIG. 5, the program storing section 47 stores a user program executable on the CPU 48. In the user program, an expression for obtaining a distance for which a lens 14 is shifted toward the outer edge or inner edge of an optical disk 2, a threshold value and a conversion factor are set, for example. The CPU 48 controls whole optical disk apparatus including the system shown in FIG. 5. The CPU 48 reads and executes the user program from the program storing section 47, and outputs an obtained drive value shift signal SS to the tracking control section 158.

Figure 6:
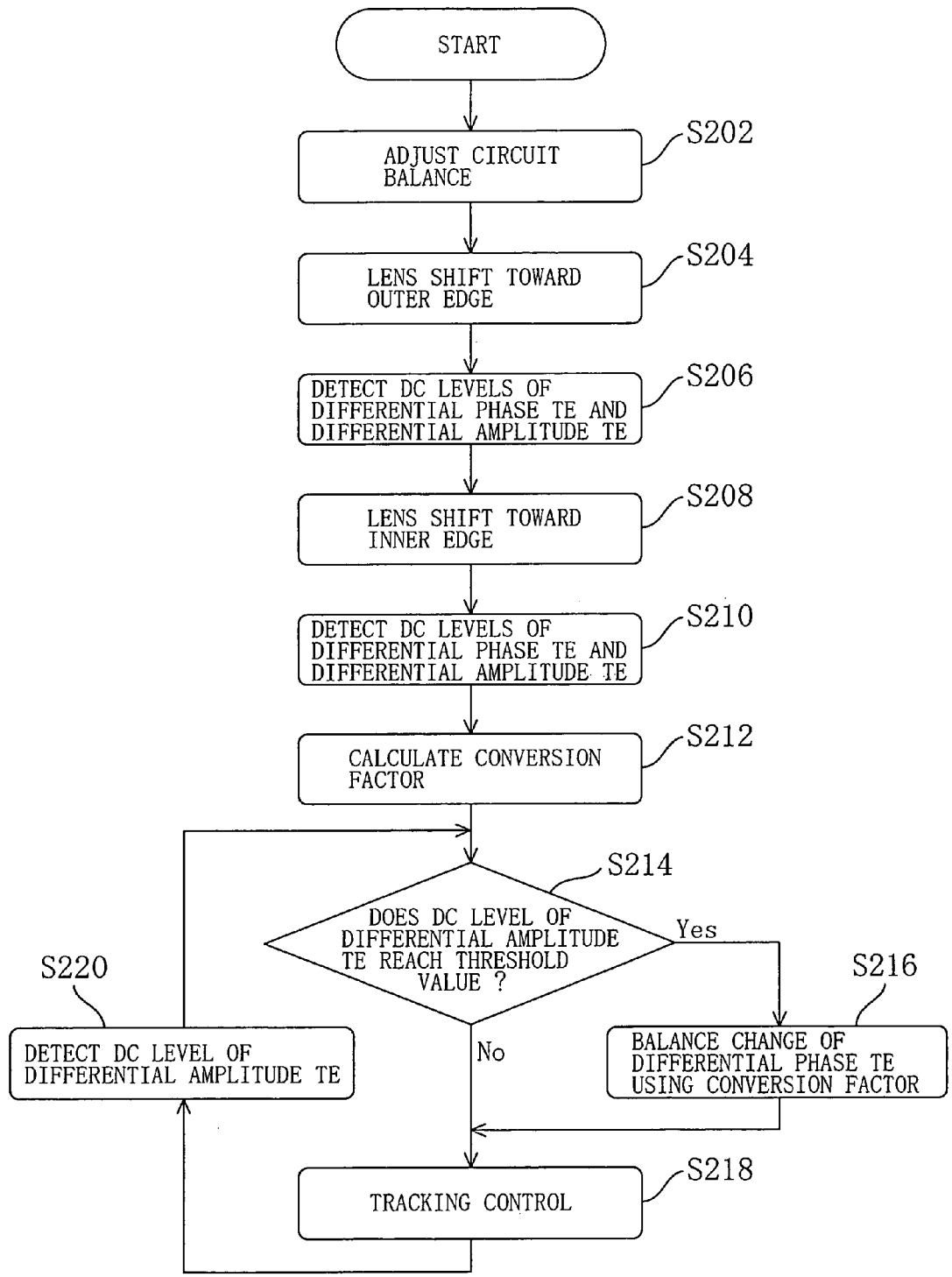
FIG. 6 is a flowchart showing generation of a differential phase tracking error signal in the second embodiment of the present invention.
Figure 7:
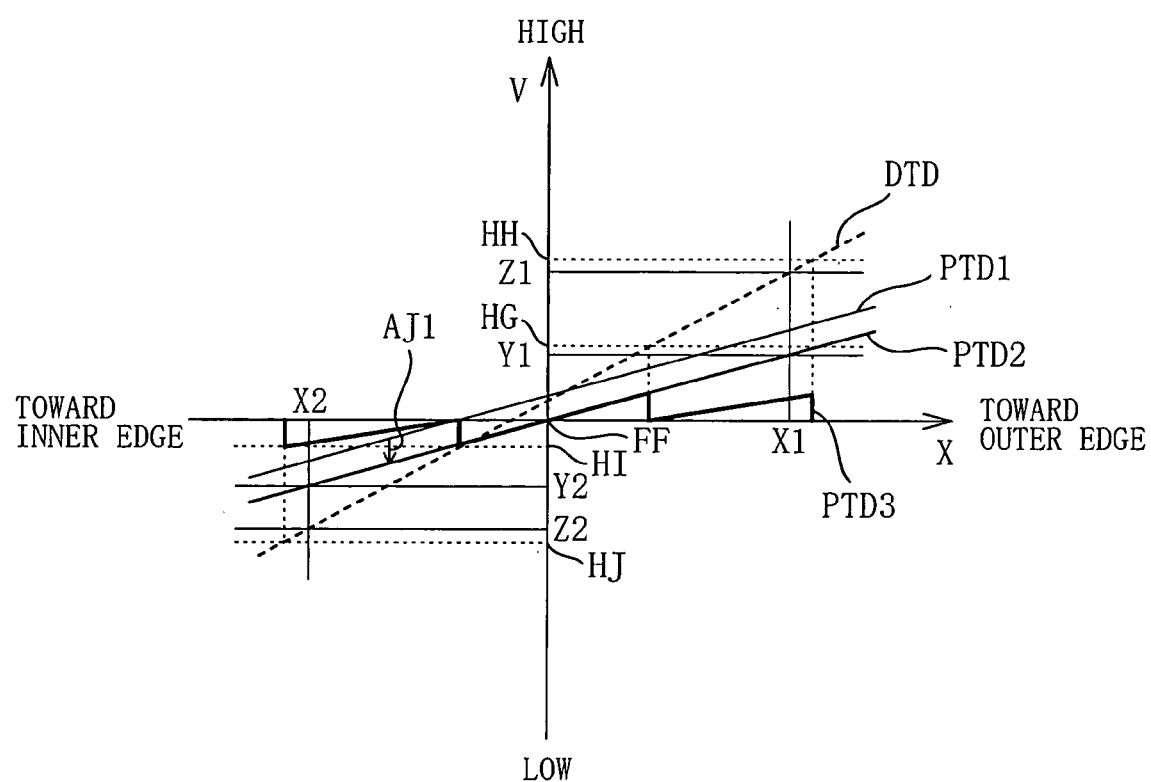
FIG. 7 is a graph for describing a balance change of the differential phase tracking error signal in the second embodiment of the present invention.

FIG. 6 is a flowchart showing generation of a differential phase tracking error signal PTE in the second embodiment of the present invention. FIG. 7 is a graph for describing a balance change of the differential phase tracking error signal PTE in the second embodiment of the present invention.

In FIG. 7, the abscissa represents the lens shift amount X, while the ordinate represents the potential. An initial circuit balance adjustment as in step S202 is performed, so that a DC level PTD1 of the differential phase tracking error signal PTE before the initial balance adjustment becomes a DC level PTD2 after the initial balance adjustment. The graph of the DC level PTD2 passes through the original point FF corresponding to a reference potential DC0. This procedure is the same as in FIG. 4.

The flow shown in FIG. 6 will be described with reference to FIG. 7. It is assumed that at the start of the flow in FIG. 6, focus control is performed such that the distance between a lens 14 for focusing a light beam and an optical disk 2 is substantially constant.

In step S202, the balance changing section 33 performs an initial circuit balance adjustment so as to eliminate a potential deviation of the DC level steadily output from sections such as the differential phase TE generating section 31 and the amplitude gain setting section 32 regarding generation of the differential phase tracking error signal PTE. That is to say, the balance changing section 33 shifts the output of the amplitude gain setting section 32 so as to equalize the upper-part and the lower-part of the differential phase tracking error signal PTE with each other.

By performing such an initial circuit balance adjustment, the DC level PTD1 of the differential phase tracking error signal PTE before the circuit balance adjustment is shifted by a voltage AJ1 to be the DC level PTD2 of the differential phase tracking error signal PTE after the circuit balance adjustment.

In step S204, the tracking control section 158 outputs a tracking control signal in accordance with a drive value shift signal SS output from the CPU 48 such that the optical pickup 10 is shifted toward the outer edge of the optical disk 2 by a predetermined distance X1 from the position corresponding to the origin point of the graph shown in FIG. 7. At this time, the optical pickup 10 reaches a first tracking position.

In step S206, the balance correcting section 235 outputs a differential amplitude tracking error signal DTE and a differential phase tracking error signal PTE to the CPU 48. The CPU 48 obtains a potential Z1 of the DC level DTD of the differential amplitude tracking error signal DTE at this time and a potential Y1 of the DC level PTD2 of the differential phase tracking error signal PTE at this time.

In step S208, the tracking control section 158 outputs a tracking control signal in accordance with the drive value shift signal SS output from the CPU 48 such that the optical pickup 10 is shifted toward the inner edge of the optical disk 2 by a predetermined distance X2 from the position corresponding to the origin point of the graph shown in FIG. 7. At this time, the optical pickup 10 reaches a second tracking position.

In step S210, the balance correcting section 235 outputs a differential amplitude tracking error signal DTE and a differential phase tracking error signal PTE to the CPU 48. The CPU 48 obtains a potential Z2 of the DC level DTD of the differential amplitude tracking error signal DTE at this time and a potential Y2 of the DC level PTD2 of the differential phase tracking error signal PTE at this time.

In step S212, the CPU 48 obtains a conversion factor for obtaining the DC level PTD2 from the DC level DTD using the detected potentials Y1, Y2, Z1 and Z2. The CPU 48 obtains a conversion factor C1 using, for example, the following equation (1):

$$C1=(Y1-Y2)/(Z1-Z2) \qquad (1)$$

After this step, the CPU 48 does not output the drive value shift signal SS any more.

In step S214, the CPU 48 compares the DC level DTD of the differential amplitude tracking error signal DTE with each of the threshold values HG, HH, HI and HJ set in the user program. If the DC level DTD reaches one of the threshold values HG through HJ, the process proceeds to step S216. In the other cases, the process proceeds to step S218.

In step S216, the CPU 48 obtains the product of the conversion factor C1 calculated in step S212 and the DC level DTD as a balance value, and outputs the balance value to the balance correcting section 235. The balance correcting section 235 calculates a balance correction amount in accordance with the balance value, and outputs the balance correction amount to the balance changing section 33. The balance changing section 33 shifts the output of the amplitude gain setting section 32 in accordance with the balance correction amount, and performs a balance change of the differential phase tracking error signal PTE. Then, the DC level of the differential phase tracking error signal PTE after the balance change becomes a DC level PTD3.

In step S218, the tracking control section 158 outputs a tracking control signal in accordance with the differential phase tracking error signal PTE, and the tracking drive section 59 performs tracking control using this signal. In step S220, the balance correcting section 235 outputs a differential amplitude tracking error signal DTE to the CPU 48, and the CPU 48 detects the DC level DTD thereof. Thereafter, the process returns to step S214.

In this manner, according to this embodiment, it is possible to reduce the difference between the DC level PTD3 of the differential phase tracking error signal PTE and the reference potential DC0. The balance value is obtained using a conversion factor obtained for every optical pickup. Therefore, even if the number of threshold values to be set is small, the same advantages as those in the first embodiment are achieved.

First Modified Example of Embodiment 2

Figure 8:
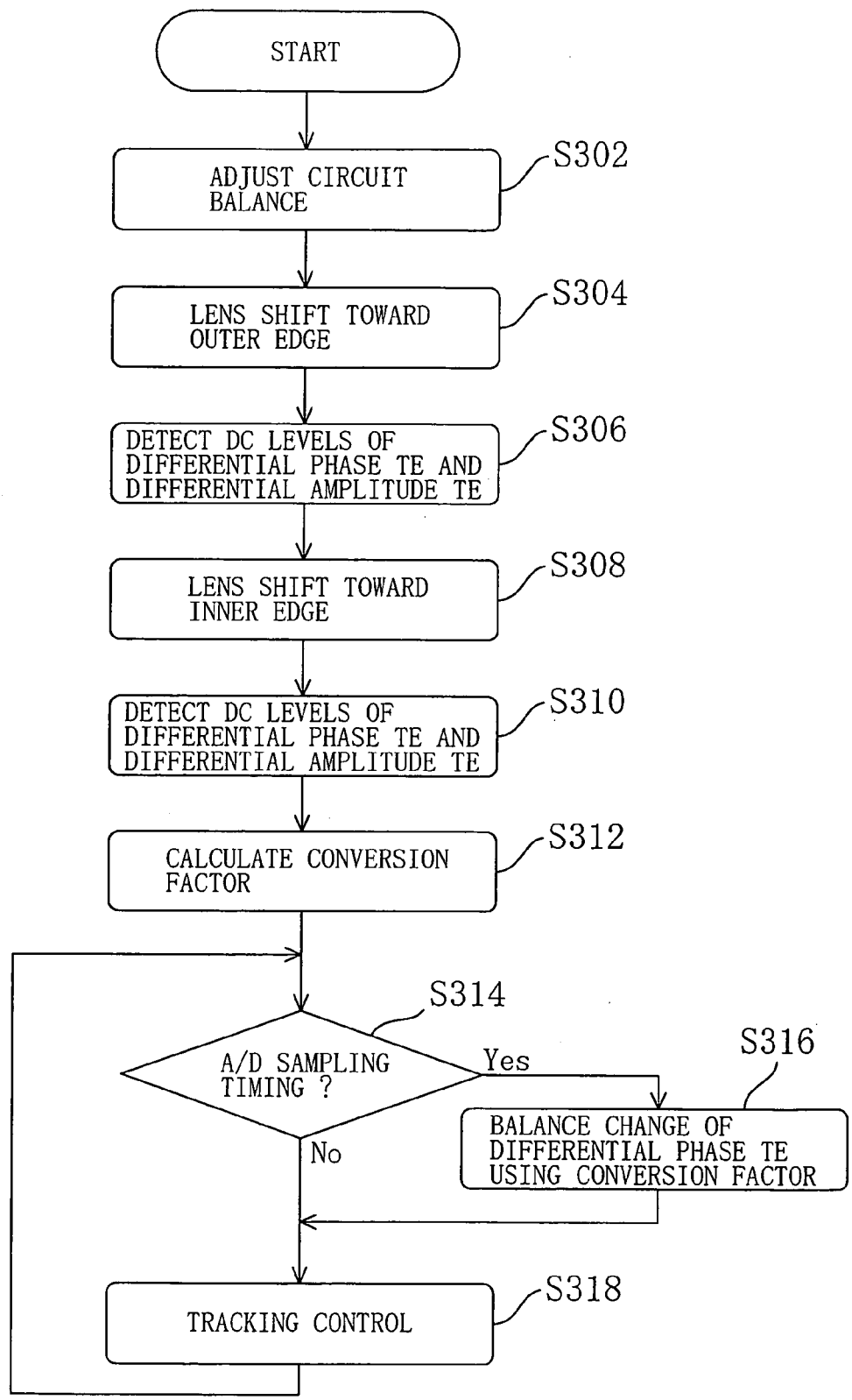
FIG. 8 is a flowchart showing generation of a differential phase tracking error signal in a first modified example of the second embodiment of the present invention.
Figure 9:
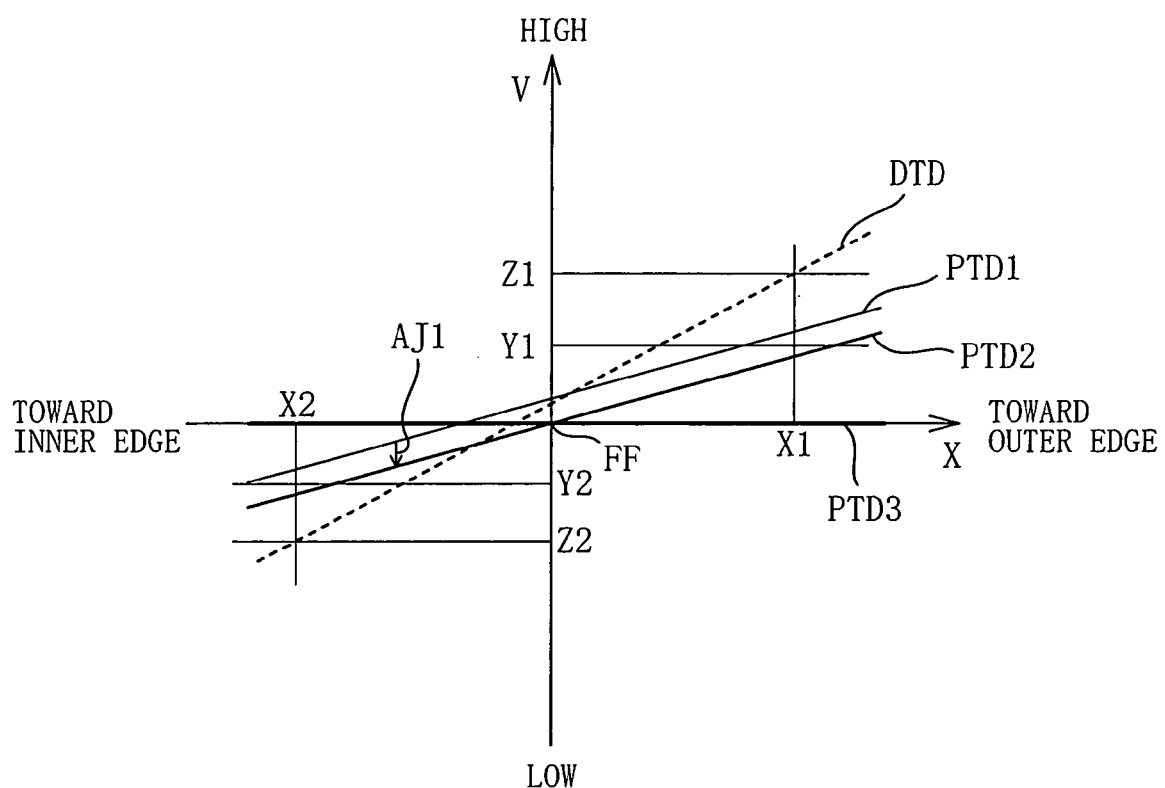
FIG. 9 is a graph for describing a balance change of the differential phase tracking error signal in the first modified example of the second embodiment of the present invention.

FIG. 8 is a flowchart showing generation of a differential phase tracking error signal PTE in a first modified example of the second embodiment of the present invention. FIG. 9 is a graph for describing a balance change of the differential phase tracking error signal PTE in the first modified example of the second embodiment of the present invention. The configuration of the tracking control system according to this modified example is the same as that described with reference to FIG. 5, except for a program to be stored in the program storing section 47.

The flow shown in FIG. 8 will be described with reference to FIG. 9. The processes in steps S302, S304, S306, S308, S310 and S312 shown in FIG. 8 are the same as those in respective steps S202, S204, S206, S208, S210 and S212 shown in FIG. 6 and therefore the description thereof will be omitted herein.

In step S314, the CPU 48 determines whether or not it is the time for the A/D converting section 44, which converts the differential amplitude tracking error signal DTE into a digital value, to perform sampling. If it is the time to perform sampling, the process proceeds to step S316. In the other cases, the process proceeds to step S318.

The processes in steps S316 and S318 are the same as those in respective steps S216 and S218 in FIG. 6. When step S318 terminates, the process proceeds to step S314.

The CPU 48 multiplies the detected DC level DTD of the differential amplitude tracking error signal DTE by the conversion factor C1 and performs a balance change of the differential phase tracking error signal PTE using the obtained multiplication result, every time the A/D converting section 44 performs sampling. Therefore, as shown in FIG. 9, the DC level PTD3 of the differential phase tracking error signal PTE after the balance change is almost always at the reference potential DC0. Accordingly, even if the lens is shifted, it is possible to obtain an ideal well-balanced differential phase tracking error signal PTE.

In the foregoing description, the determination is made every time the A/D converting section 44 performs sampling in step S314. Alternatively, the determination may be made every time after the A/D converting section 44 has performed sampling a given number of times.

Second Modified Example of Embodiment 2

Figure 10:
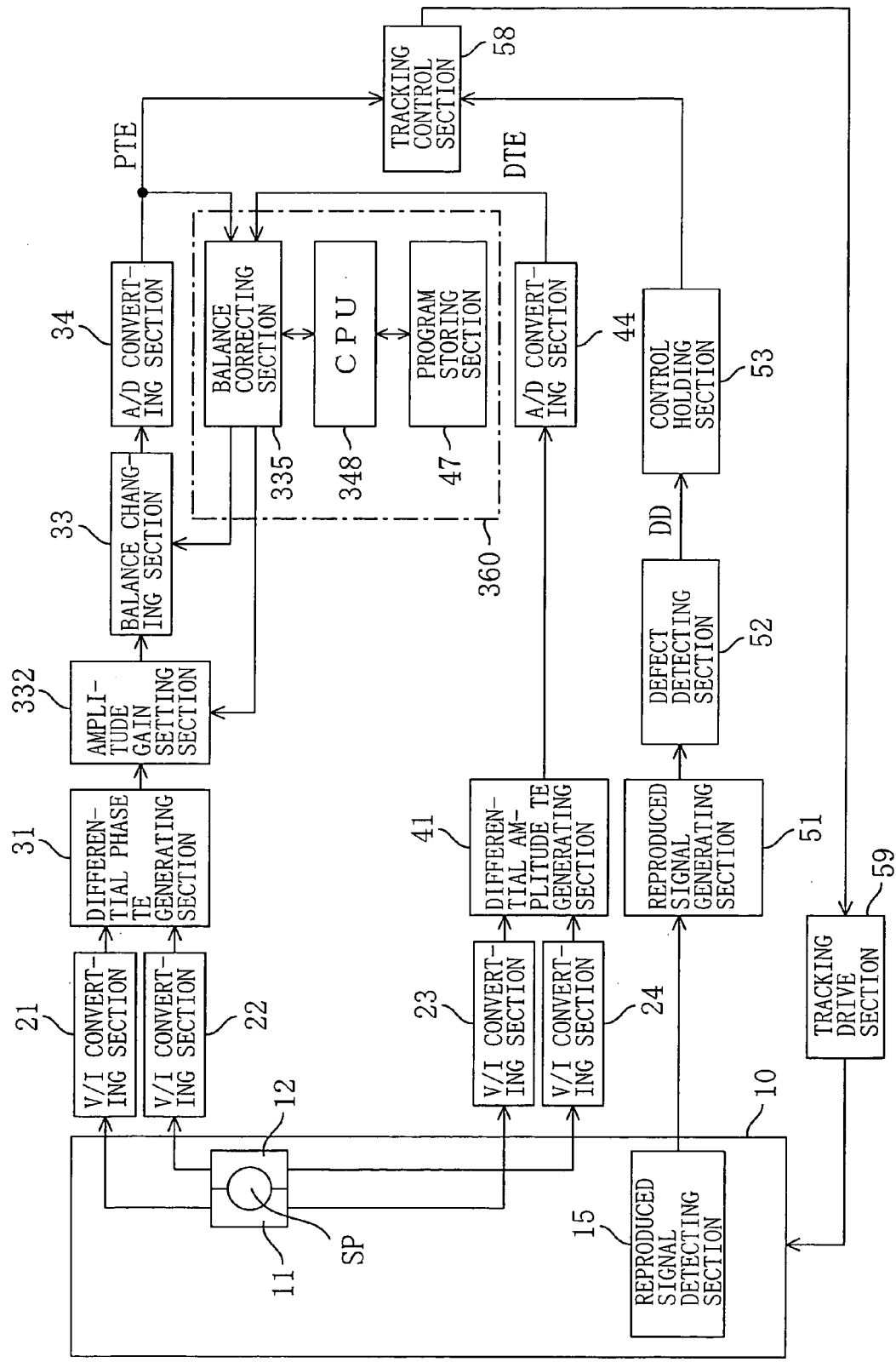
FIG. 10 is a block diagram showing an example of a configuration of a tracking control system according to a second modified example of the second embodiment of the present invention.

FIG. 10 is a block diagram showing an example of a configuration of a tracking control system according to a second modified example of the second embodiment of the present invention. The tracking control system shown in FIG. 10 includes: an amplitude gain setting section 332; a balance correcting section 335; a CPU 348; and a tracking control section 58, instead of the amplitude gain setting section 32, balance correcting section 235, CPU 48 and tracking control section 158 in the tracking control system shown in FIG. 5. The program storing section 47, the CPU 348 and the balance correcting section 335 together constitute a balance correction amount calculating section 360. The balance correcting section 335 outputs an input differential phase tracking error signal PTE and differential amplitude tracking error signal DTE to the CPU 348.

In FIG. 10, the program storing section 47 stores a user program executable on the CPU 348. In the user program, threshold values HA, HB, HC, HD, HE and HF as shown in FIG. 4 and balance values corresponding to the respective threshold values are set. The CPU 348 controls whole optical disk apparatus including the system shown in FIG. 10. The CPU 348 reads and executes the user program from the program storing section 47, and compares a DC level DTD of the differential amplitude tracking error signal DTE with each of the threshold values HA through HF.

When the DC level DTD reaches one of the threshold values HA through HF, the CPU 348 outputs the balance value corresponding to the threshold value to the balance correcting section 335. The balance correcting section 335 outputs the balance correction amount corresponding to the balance value to the balance changing section 33. The balance changing section 33 shifts the differential phase tracking error signal PTE by the balance correction amount, so that a DC level PTD3 of the differential phase tracking error signal PTE after balance change is obtained as shown in FIG. 4.

Thereafter, in order to make the amplitude of the differential phase tracking error signal PTE have a given magnitude, the CPU 348 outputs a gain according to the current amplitude to the amplitude gain setting section 332 via the balance correcting section 335. The amplitude gain setting section 332 multiplies the differential phase tracking error signal output from the differential phase TE generating section 31 by the gain, and outputs the result to the balance changing section 33. Then, a differential phase tracking error signal PTE whose DC level does not deviate from the reference potential DC0 greatly and which has a predetermined amplitude can be obtained.

Third Modified Example of Embodiment 2

Figure 11:
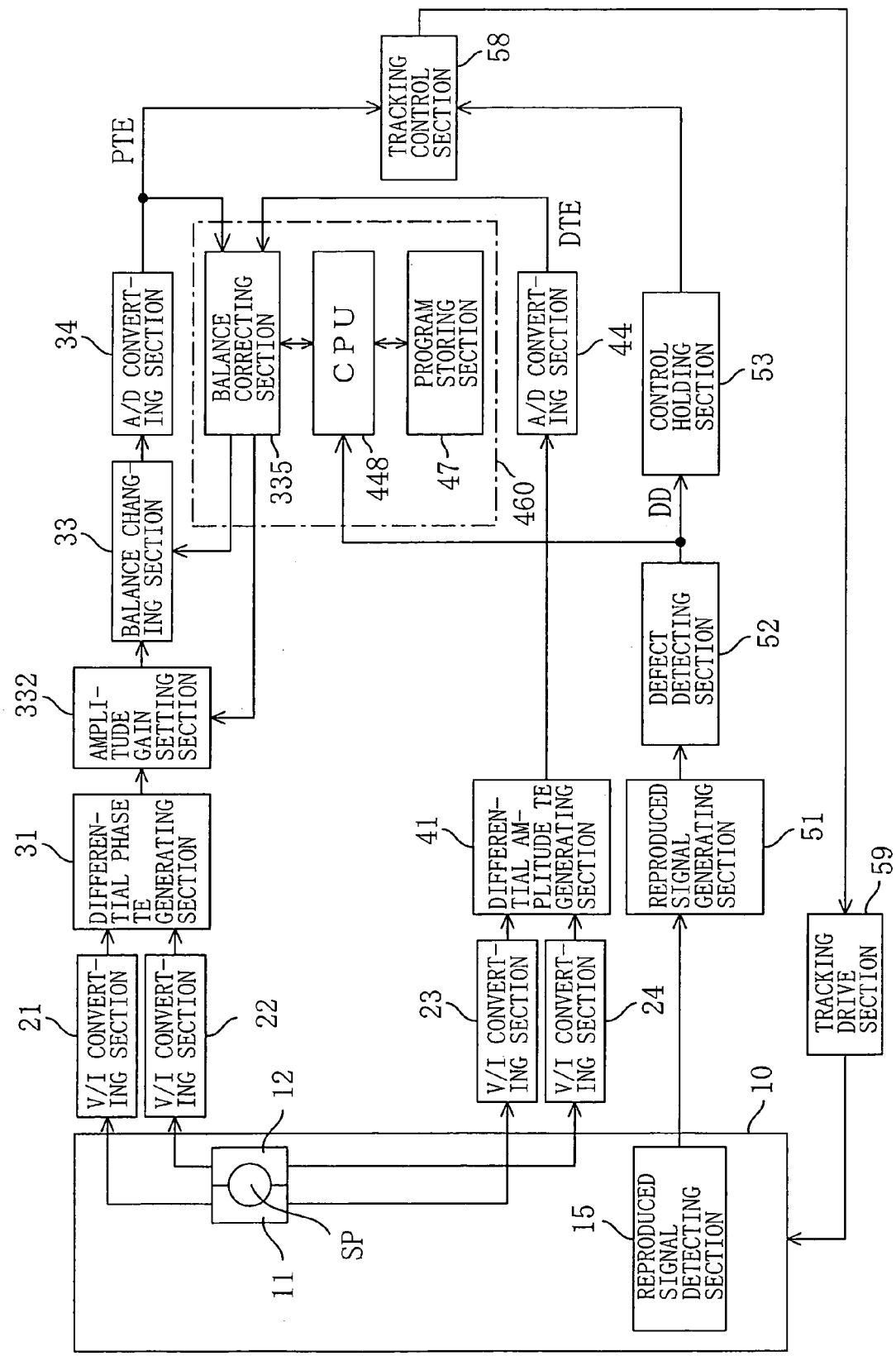
FIG. 11 is a block diagram showing an example of a configuration of a tracking control system according to a third modified example of the second embodiment of the present invention.

FIG. 11 is a block diagram showing an example of a configuration of a tracking control system according to a third modified example of the second embodiment of the present invention. The tracking control system shown in FIG. 11 includes a CPU 448, instead of the CPU 348 in the tracking control system shown in FIG. 10. The program storing section 47, the CPU 448 and the balance correcting section 335 together constitute a balance correction amount calculating section 460.

The tracking control system shown in FIG. 11 is different from the tracking control system shown in FIG. 10 in that the defect detecting section 52 also outputs a defect detection signal DD to the CPU 448.

If the defect detection signal DD indicates that a defect is present on the optical disk, the CPU 448 resets a balance value to be output to the balance correcting section 335 to a given value such as an initial value or holds the balance value before the detection of the defect, thereby producing an output.

According to this modified example, it is possible to prevent the DC level of the differential phase tracking error signal PTE from taking an inappropriate value due to the influence of the defect on the optical disk.

Embodiment 3

In the foregoing embodiments, a balance value is obtained in consideration of influence of a lens shift in the radial direction of the optical disk. However, in this embodiment, a balance value is obtained in further consideration of influence of an aberration of the lens.

Figure 12:
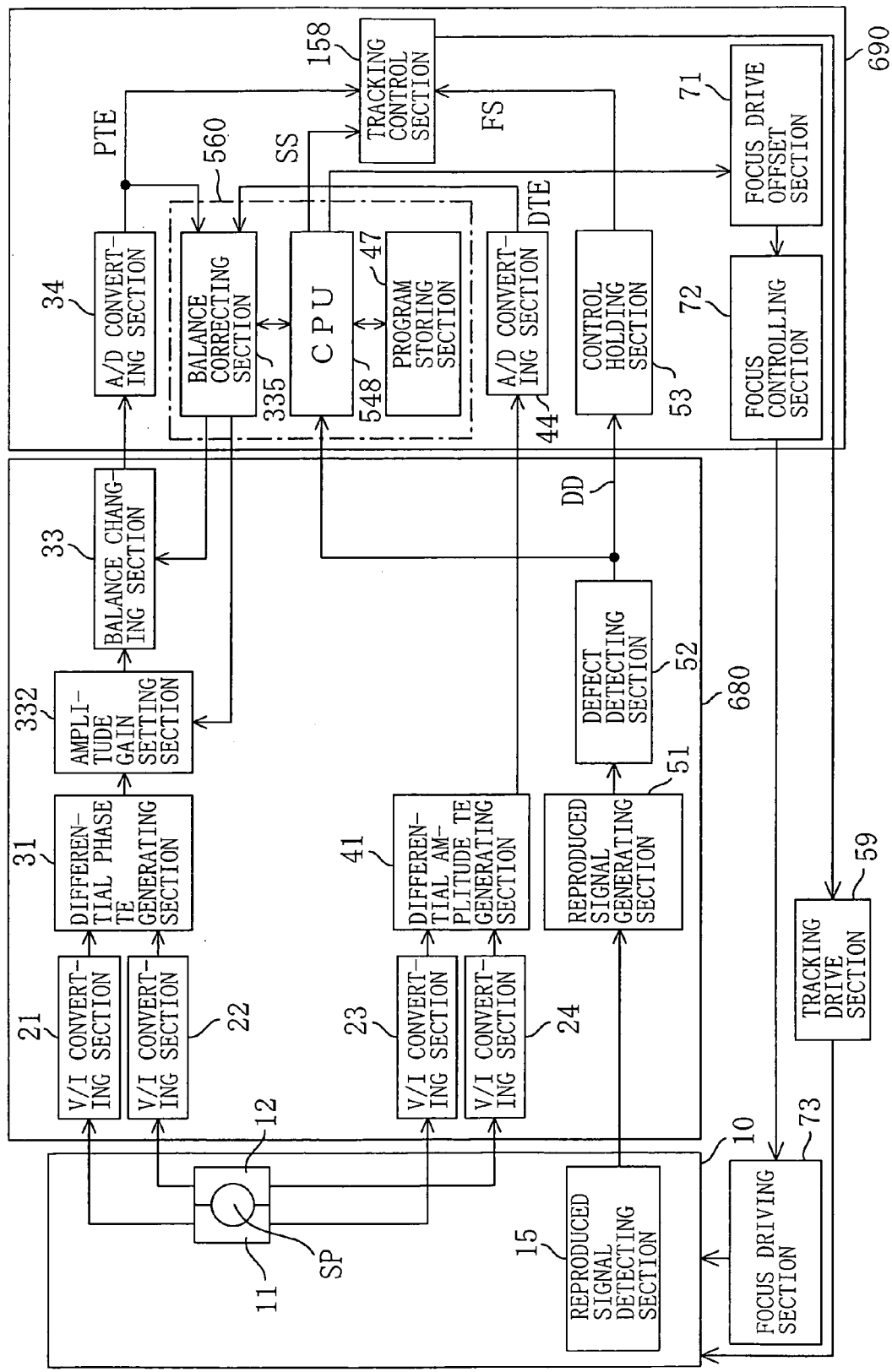
FIG. 12 is a block diagram showing an example of a configuration of a tracking control system according to a third embodiment of the present invention.

FIG. 12 is a block diagram showing an example of a configuration of a tracking control system according to a third embodiment of the present invention. The tracking control system shown in FIG. 12 includes: a focus drive offset section 71; a focus controlling section 72; and a focus driving section 73 in addition to the components of the tracking control system shown in FIG. 11. The tracking control system shown in FIG. 12 includes: a tracking control section 158; and a CPU 548, instead of the tracking control section 58 and the CPU 448, respectively, shown in FIG. 11. The program storing section 47, the CPU 548 and the balance correcting section 335 together constitute a balance correction amount calculating section 560.

The CPU 548 reads and executes a program from the program storing section 47 and outputs a value set in the program to the focus drive offset section 71 as a focus shift value FS. The focus drive offset section 71 outputs a focus drive value XF to the focus controlling section 72 in accordance with the focus shift value FS. The focus controlling section 72 outputs a focus control signal to the focus driving section 73 so as to keep the distance between an optical pickup 10 and an optical disk 2 constant.

The focus controlling section 72 outputs the focus control signal such that the distance is changed in accordance with the focus drive value XF. The focus driving section 73 drives the optical pickup 10 in accordance with the focus drive signal. The focus drive offset section 71 is also used to optimize a control constant, e.g., to balance the focus drive value XF.

The CPU 548 moves the optical pickup 10 toward the optical disk or away from the optical disk, and detects a DC level of a differential phase tracking error signal PTE when the optical pickup 10 is moved in each of the directions. The CPU 548 obtains a balance value required due to the influence of an aberration of a lens based on the detected DC level of the differential phase tracking error signal PTE.

Figure 13:
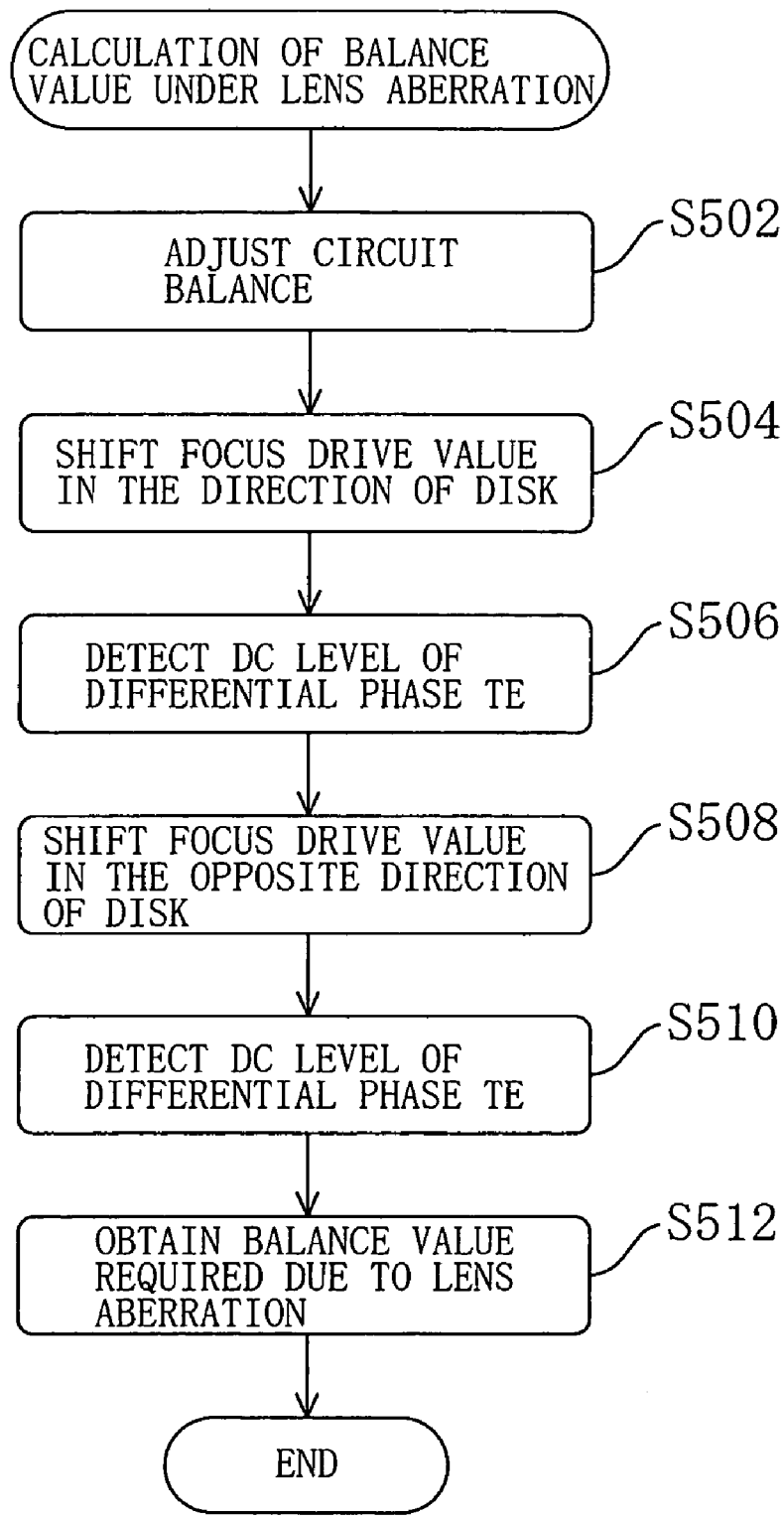
FIG. 13 is a flowchart showing generation of a differential phase tracking error signal in the third embodiment of the present invention.
Figure 14:
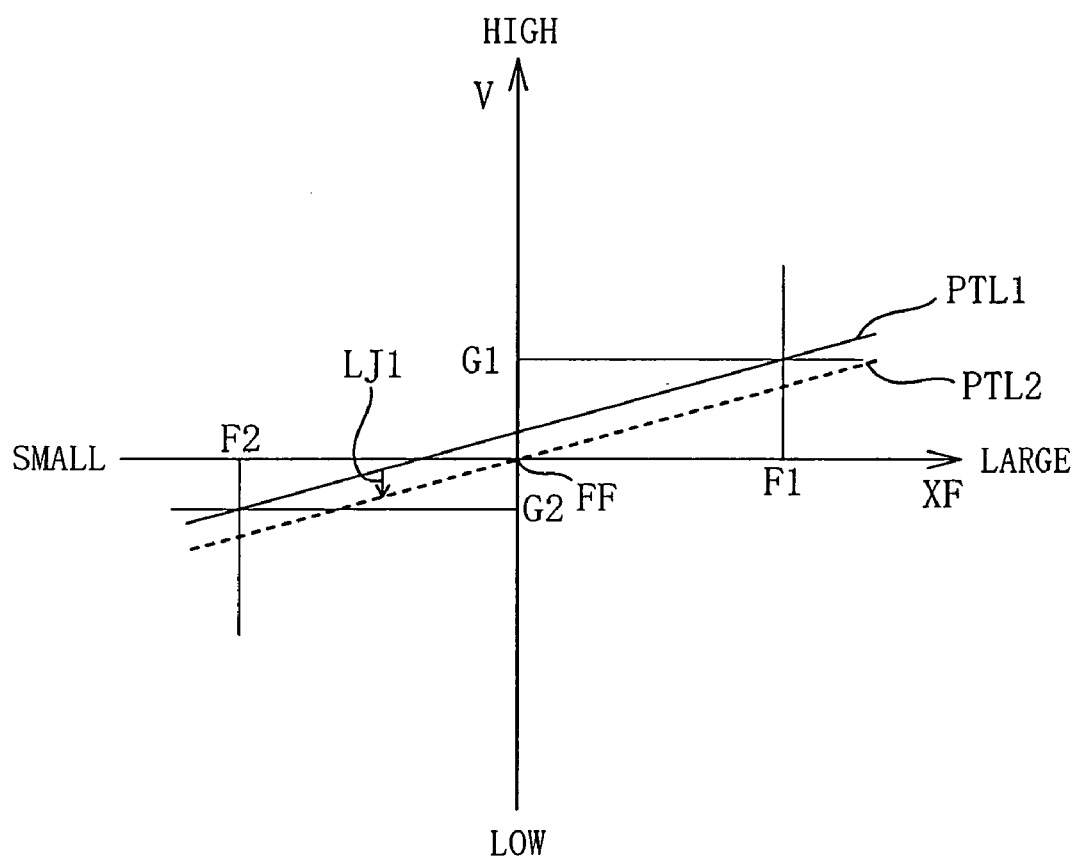
FIG. 14 is a graph for describing a balance change of the differential phase tracking error signal in the third embodiment of the present invention.

FIG. 13 is a flowchart showing generation of a differential phase tracking error signal PTE in the third embodiment of the present invention. FIG. 14 is a graph for describing a balance change of the differential phase tracking error signal PTE in the third embodiment of the present invention.

In FIG. 14, the abscissa represents a focus drive value XF for use in focus control for keeping the distance between the lens 14 and the optical disk 2 substantially constant. The focus drive value XF increases as the lens 14 is moved toward the optical disk, while decreasing as the lens is moved away from the optical disk. The intersection point of the abscissa and the ordinate represents the case where the focal point of the lens 14 is on the recording surface of the optical disk 2, i.e., an in-focus position. The ordinate represents the potential.

The flow shown in FIG. 13 will be described with reference to FIG. 14. The process shown in FIG. 13 is performed before the process shown in FIG. 3, 6 or 8, for example, is initiated. It is assumed that at the start of the flow in FIG. 13, focus control is performed such that the distance between the lens 14 for focusing a light beam and the optical disk 2 is substantially constant. The process in step S502 is the same as that in step S202 in FIG. 3.

In step S504, the focus drive offset section 71 shifts the focus drive value XF for a distance F1 as large as possible from the in-focus position in accordance with a signal output from the CPU 548 so as to move the lens 14 on the optical pickup 10 close to the optical disk 2. At this time, the lens 14 reaches a first focus position.

In step S506, the balance correcting section 335 outputs a differential phase tracking error signal PTE to the CPU 548. The CPU 548 obtains a potential G1 of a DC level PTL1 of the differential phase tracking error signal PTE at this time.

In step S508, the focus drive offset section 71 shifts the focus drive value XF for a distance F2 as large as possible from the in-focus position in accordance with a signal output from the CPU 548 so as to move the lens 14 on the optical pickup 10 away from the optical disk 2. At this time, the lens 14 reaches a second focus position.

In step S510, the balance correcting section 335 outputs a differential phase tracking error signal PTE to the CPU 548. The CPU 548 obtains a potential G2 of the DC level PTL1 of the differential phase tracking error signal PTE at this time.

In step S512, the CPU 548 obtains a DC level of the differential phase tracking error signal PTE at a position between the first and second focus positions, i.e., a balance value required due to the influence of the lens aberration, using the detected potentials G1 and G2. For example, the CPU 548 obtains the average of the potentials G1 and G2 as a balance value required due to the influence of the lens aberration.

Then, the CPU 548 outputs a value obtained by respectively multiplying the balance value required due to the influence of the lens shift described with reference to FIG. 4 or 7, for example, and the balance value required due to the influence of the lens aberration by one-half and then by summing the results, i.e., the average value of these balance values, to the balance correcting section 335 as a general balance value. In this manner, the influence of the lens shift and the influence of the lens aberration are both reduced.

In steps S504 and S508, the shift is made for a distance as large as possible. Alternatively, the shift may be made for a predetermined distance.

In addition, the CPU 548 may output, as a general balance value, a value obtained by multiplying the balance value required due to the influence of the lens shift and the balance value required due to the influence of the lens aberration by respective given coefficients and then summing the results.

Further, if the balance value required due to the influence of the lens aberration exceeds a given value, the CPU 548 may output a value obtained in consideration of this excess as a general balance value. Then, it is possible to prevent excessive correction of the influence of the lens aberration.

As described above, according to this embodiment, the balance change is performed in consideration of the lens aberration. Accordingly, it is possible to correct the DC level PTD of the differential phase tracking error signal PTE such that the DC level PTD approaches a value in the case where there is no lens aberration.

Modified Example of Embodiment 3

Figure 15:
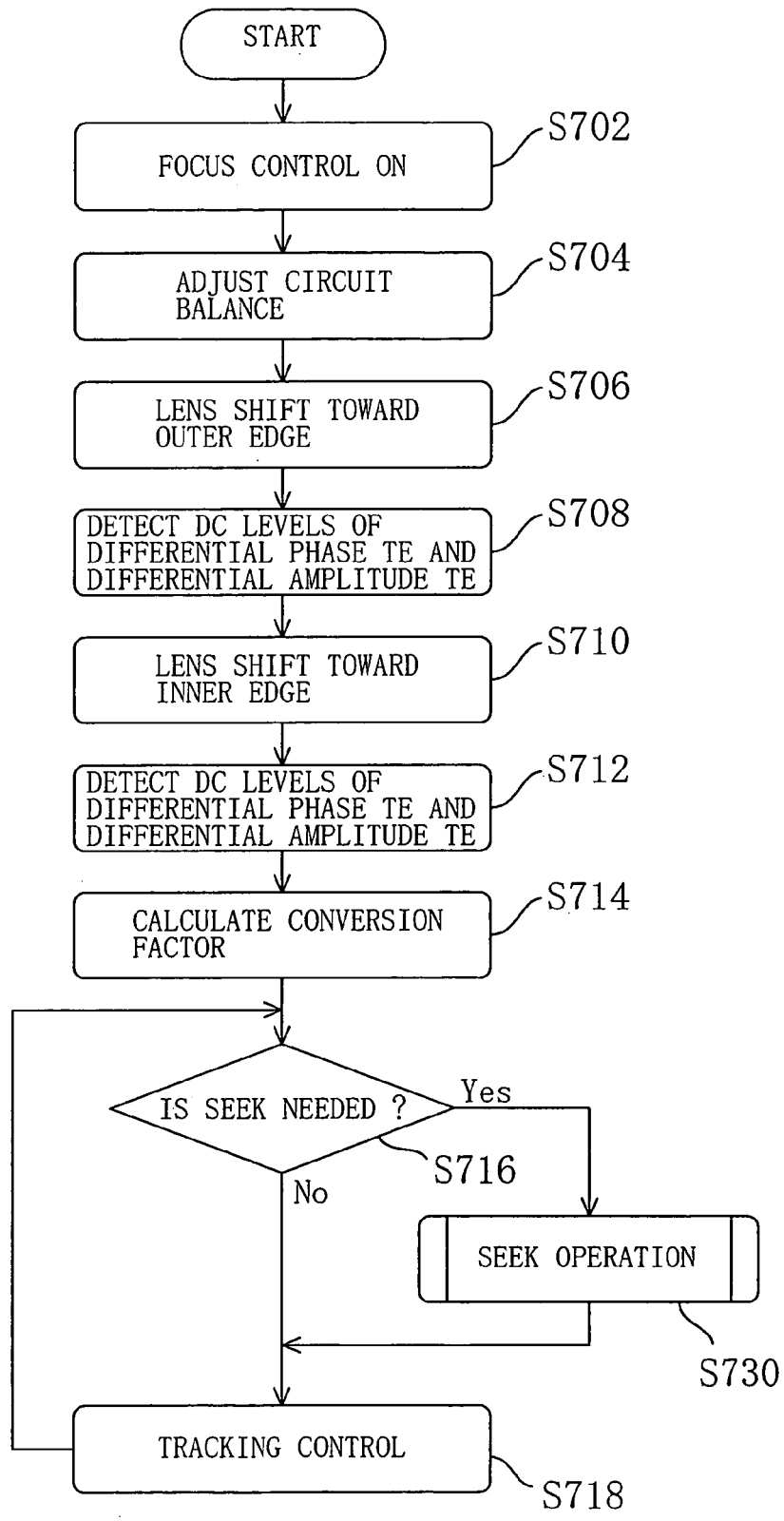
FIG. 15 is a flowchart showing generation of a differential phase tracking error signal in a modified example of the third embodiment of the present invention.
Figure 16:
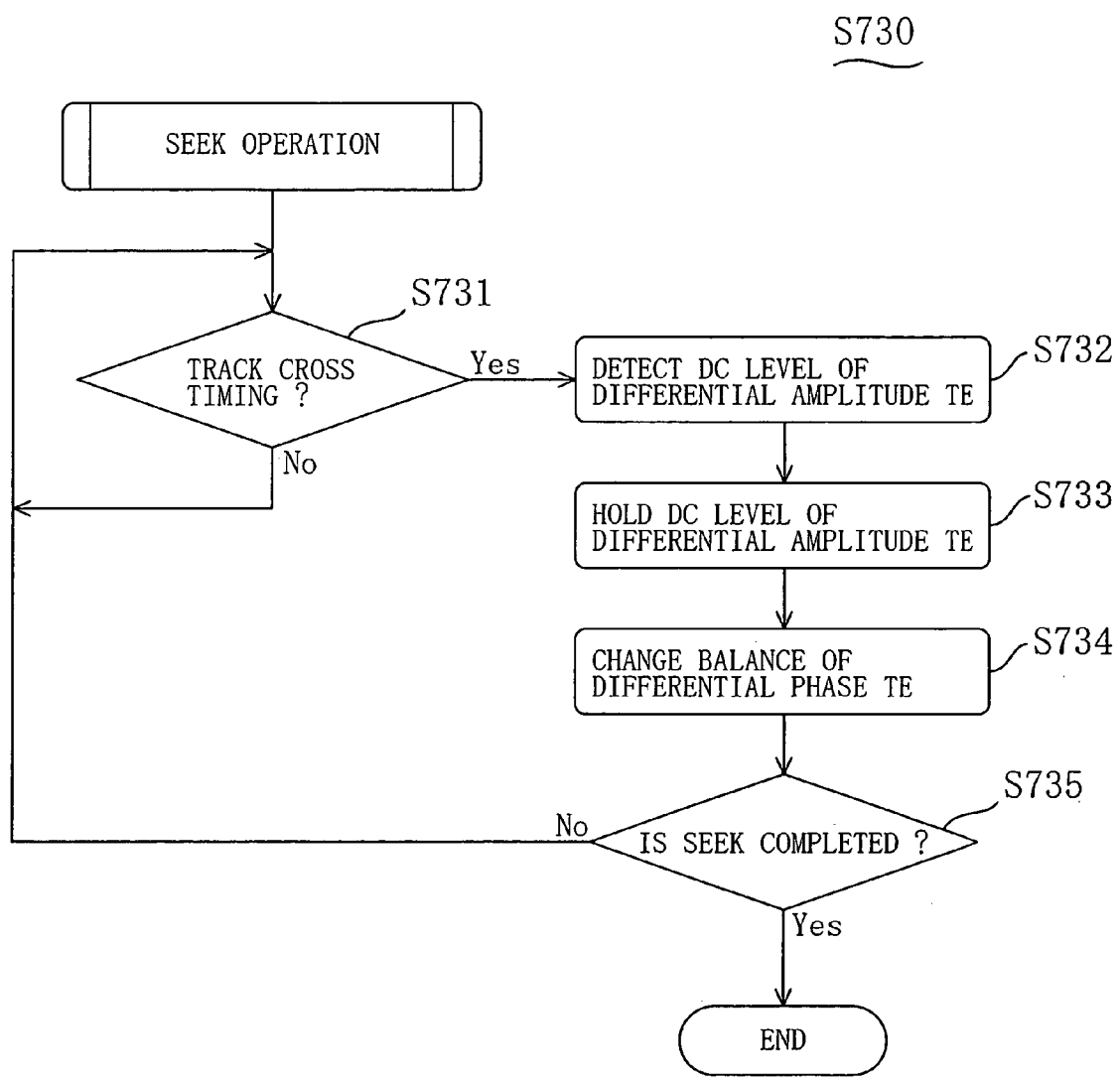
FIG. 16 is a flowchart showing a processing flow during seek operation for transferring a light beam to a track on the optical disk.
Figure 17:
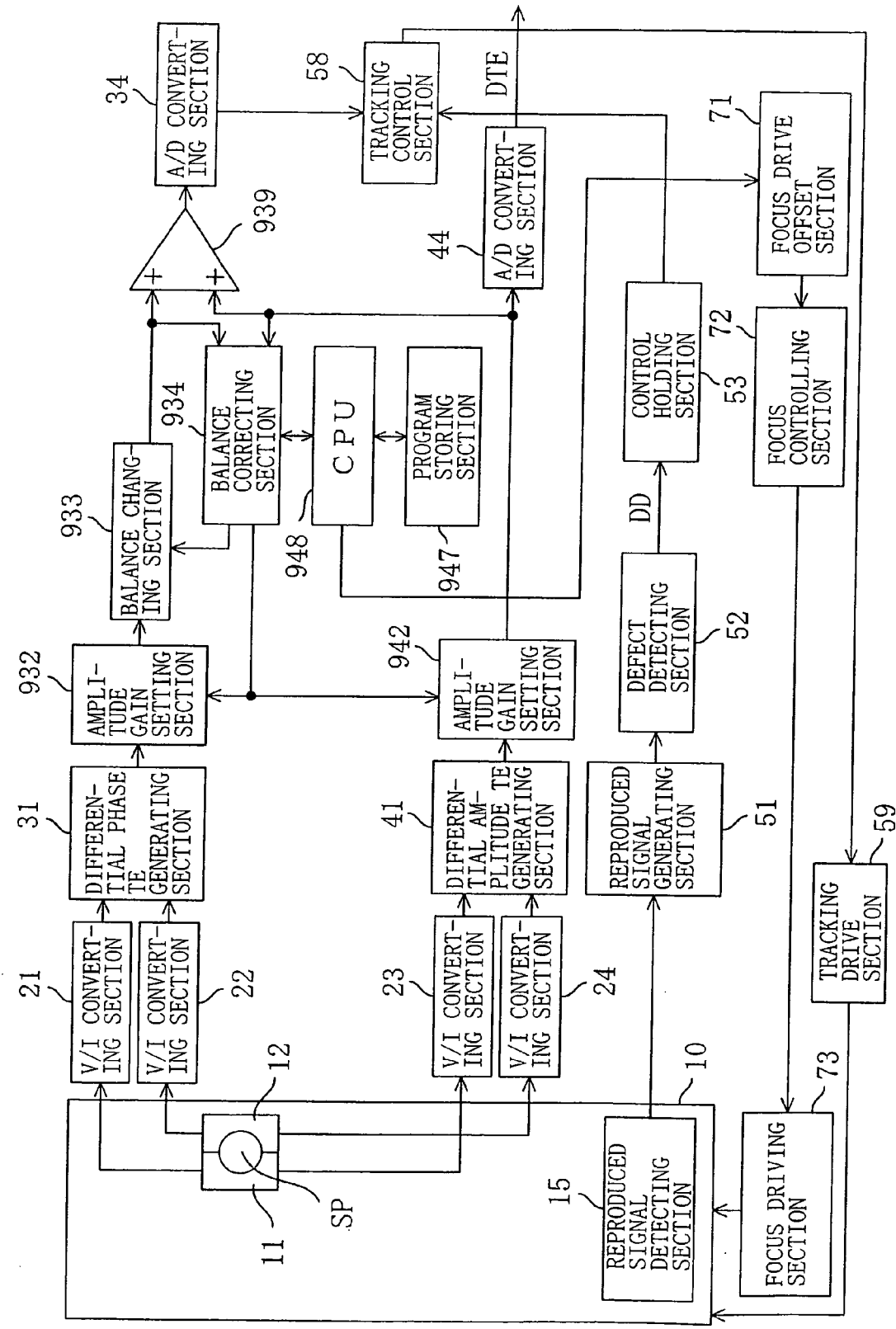
FIG. 17 is a block diagram showing an example of a configuration of the known tracking control system.
Figure 19A:
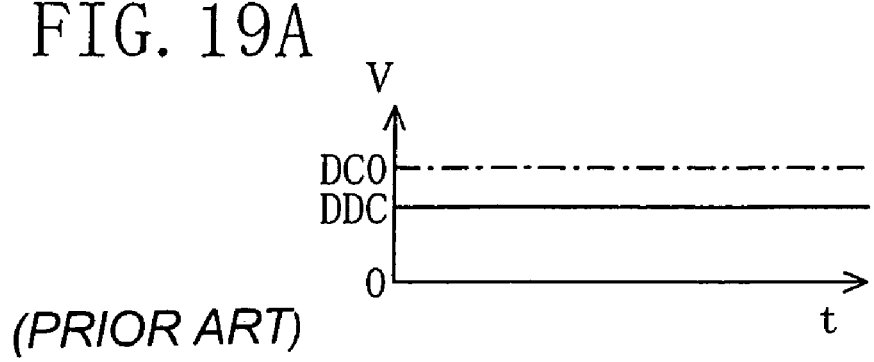
FIG. 19A is a graph showing a DC level of a differential amplitude tracking error signal in the case shown in FIG. 18C.
Figure 19B:
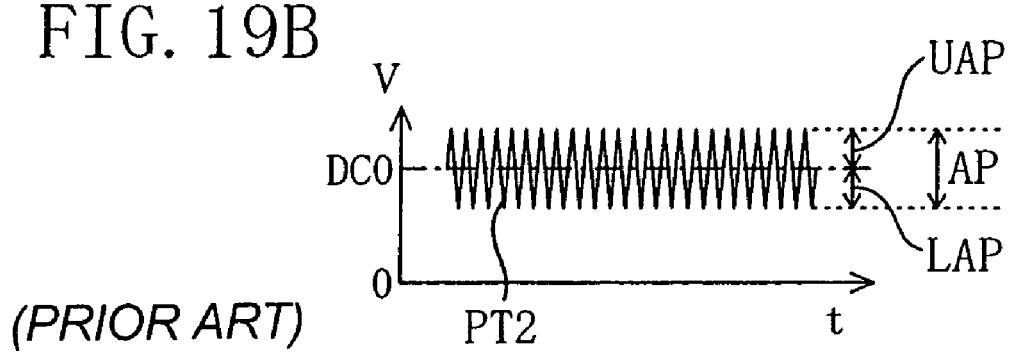
FIG. 19B is a graph showing a differential phase tracking error signal in the case of a balance change.
Figure 19C:
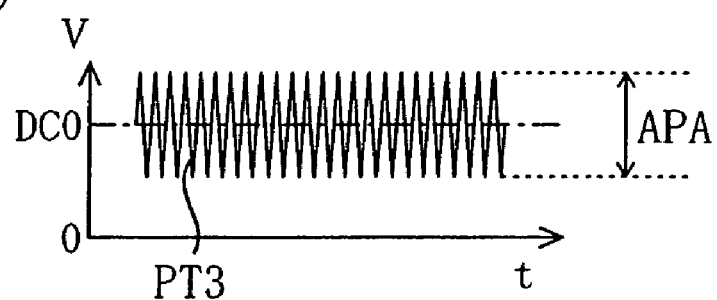
FIG. 19C is a graph showing a differential phase tracking error signal in the case of correcting the balance and the amplitude.
Figure 20A:
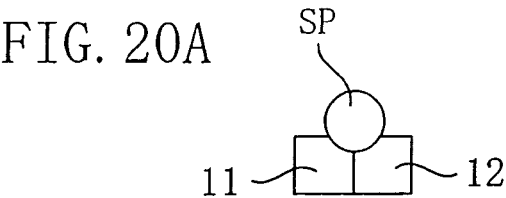
FIG. 20A is an illustration showing a positional relationship between a light spot and light receiving sections in the case of the absence of both a lens aberration and a lens shift.
Figure 20B:
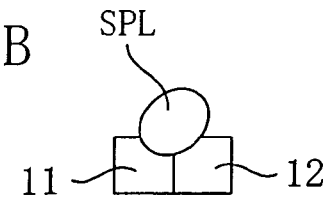
FIG. 20B is an illustration showing a positional relationship between the light spot and the light receiving sections in the case where the lens has an aberration and exhibits no lens shift.
Figure 20C:
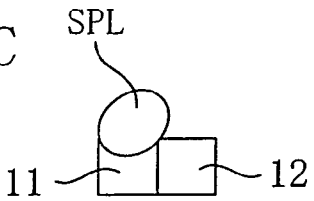
FIG. 20C is an illustration showing a positional relationship between a light spot and the light receiving sections in the case where the lens has an aberration and exhibits a lens shift.
Figure 20D:
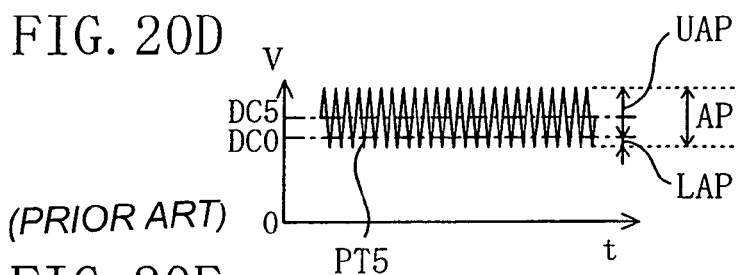
FIG. 20D is a graph showing a differential phase tracking error signal in the case shown in FIG. 20C.
Figure 20E:
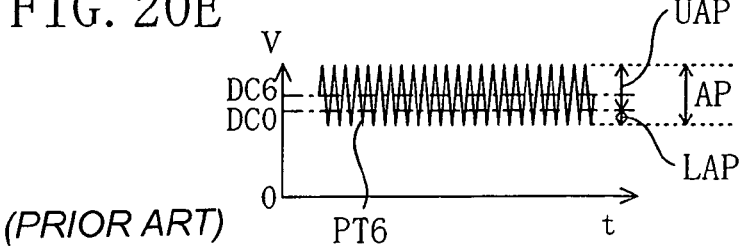
FIG. 20E is a graph showing a signal when the differential phase tracking error signal in the case shown in FIG. 20C is shifted in the same manner as in FIG. 19B.
Figure 20F:
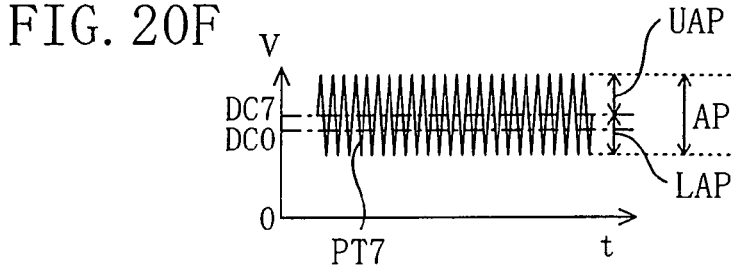
FIG. 20F is a graph showing a signal when the amplitude of the differential phase tracking error signal in the case shown in FIG. 20C is corrected in the same manner as in FIG. 19C.

FIG. 15 is a flowchart showing generation of a differential phase tracking error signal PTE in a modified example of the third embodiment of the present invention. FIG. 16 is a flowchart showing a processing flow during seek operation for transferring a light beam to a track on the optical disk. The configuration of the tracking control system of this modified example is the same as that described with reference to FIG. 12, except for a program stored in the program storing section 47.

Description will be given with reference to FIG. 15. In step S702, the CPU 548 performs focus control such that the distance between the lens 14 for focusing a light beam and the optical disk 2 is constant. The processes in steps S704, S706, S708, S710, S712 and S714 shown in FIG. 15 are the same as those in respective steps S202, S204, S206, S208, S210 and S212 shown in FIG. 6 and the description thereof will be omitted herein.

In step S716, it is determined whether seek operation is needed or not. If the seek operation is needed, the process proceeds to step S730. In the other cases, the process proceeds to step S718. In step S718, the tracking control section 158 outputs a tracking control signal in accordance with the differential phase tracking error signal PTE, and the tracking drive section 59 performs tracking control using this signal. Thereafter, the process returns to step S716.

FIG. 16 shows a process in step S730 in detail. In FIG. 16, in step S731, the CPU 548 determines whether or not it is a timing of a track cross signal indicating that the light beam crosses a track on the optical disk 2. If it is the timing of the track cross signal, the process proceeds to step S732. In the other cases, the process in step S731 is executed again.

In step S732, the CPU 548 detects the DC level of the differential amplitude tracking error signal DTE. In step S733, the CPU 548 keeps the detected DC level of the differential amplitude tracking error signal DTE.

In step S734, the CPU 548 multiplies the detected DC level of the differential amplitude tracking error signal DTE by a coefficient, and obtains a balance value of the differential phase tracking error signal PTE in accordance with the obtained value. Each of the balance correcting section 335 and the balance changing section 33 performs a balance change of the differential phase tracking error signal PTE in accordance with the obtained balance value. The conversion factor obtained in step S714 is used as the constant used for the multiplication of the differential amplitude tracking error signal DTE. Alternatively, a preset constant may be used instead of the conversion factor.

In step S735, the CPU 548 determines whether seek is completed or not. If the seek is completed, the processing of the seek operation terminates. If the seek is not completed, the process returns to step S731.

According to this modified example, in the case of performing tracking control using a tracking error signal by a differential phase detection method after the completion of seek operation, stable control is achieved.

Now, in FIG. 12, a semiconductor integrated circuit 680 for use in signal processing includes: V/I converting sections 21 through 24; a differential phase TE generating section 31; an amplitude gain setting section 332; a balance changing section 33; a differential amplitude TE generating section 41; a reproduced signal generating section 51; and a defect detecting section 52. These components are provided within one package of semiconductor integrated circuit 680.

A semiconductor integrated circuit 690 for use in control includes: A/D converting sections 34 and 44; a balance correcting section 335; a CPU 548; a program storing section 47; a control holding section 53; a tracking control section 158; a focus drive offset section 71; and a focus controlling section 72. These components are provided within one package of semiconductor integrated circuit 690.

In this embodiment, the case where part of the tracking control system shown in FIG. 12 except for the optical pickup 10, the tracking drive section 59 and the focus driving section 73 is constituted by two semiconductor integrated circuits. Alternatively, this part may be constituted by one semiconductor integrated circuit or three or more semiconductor integrated circuits.

The CPU 548 executes a user program stored in the program storing section 47. Accordingly, if the user program is changed, the tracking control system shown in FIG. 12 can perform different processing. As a result, a user can freely design control operation to operate a tracking control system.

In the foregoing embodiments, description has been made of the case where two light receiving sections for receiving light reflected from the optical disk and converting the light into electric signals are provided. However, in the case of four or more light receiving sections, the same operation can be performed so long as the light receiving sections are divided into two groups along the boundary in the circumferential direction.

In addition, the light receiving sections 11 and 12 output voltage signals in the foregoing embodiments. Alternatively, the light receiving sections 11 and 12 may output current signals. In such a case, none of the V/I converting sections 21 though 24 is needed.

As described above, according to the present invention, even if a lens shift or a lens aberration is present on an optical pickup, a tracking control system for performing stable tracking control can be provided with low cost.

What is claimed is:

1. A tracking control system for outputting a tracking control signal for performing tracking control of an optical pickup including a plurality of light detecting sections each of which detects, via a lens, reflected light of a light beam applied to an optical disk, converts the detected light into an electric signal, and outputs the signal, the tracking control system comprising:

a differential phase tracking error signal generating section for generating and outputting a differential phase tracking error signal based on a difference in phase between signals output from the plurality of light detecting sections;

a differential amplitude tracking error signal generating section for generating and outputting a differential amplitude tracking error signal based on a difference in value between signals output from the plurality of light detecting sections;

a balance correction amount calculating section for obtaining a direct-current component of the differential amplitude tracking error signal, and obtaining and outputting, as a balance correction amount, a value by which the differential phase tracking error signal should be shifted in accordance with the direct-current component of the differential amplitude tracking error signal such that a direct-current component of the differential phase tracking error signal approaches a given reference potential;

a balance changing section for shifting the differential phase tracking error signal in accordance with the balance correction amount, thereby outputting the shifted signal as a differential phase tracking error signal after balance change; and a tracking control section for generating and outputting the tracking control signal in accordance with the differential phase tracking error signal after balance change, wherein the tracking control section outputs the tracking control signal such that the optical pickup is moved in accordance with a drive value shift signal output from the balance correction amount calculating section, and the balance correction amount calculating section includes:

a program storing section for storing a program;

a CPU for executing the program, outputting the drive value shift signal for giving an instruction to move the optical pickup to a first tracking position closer to the outer edge of the optical disk than a position under tracking control and to a second tracking position closer to the inner edge of the optical disk than the position under tracking control, obtaining a value, as a conversion factor, by dividing a difference in the direct-current component of the differential phase tracking error signal between when the optical pickup is at the first tracking position and when the optical pickup is at the second tracking position by a difference in the direct-current component of the differential amplitude tracking error signal between when the optical pickup is at the first tracking position and when the optical pickup is at the second tracking position, and obtaining a value according to a product of the direct-current component of the differential amplitude tracking error signal and the conversion factor, thereby outputting the obtained value as a balance value; and a balance correction section for outputting the balance correction amount in accordance with the balance value.

2. The tracking control system of claim 1, wherein the CPU obtains and outputs the balance value every time the direct-current component of the differential amplitude tracking error signal reaches a given threshold value.

3. The tracking control system of claim 1, further including an A/D converting section for performing an A/D conversion of the differential amplitude tracking error signal, wherein the CPU obtains and outputs the balance value every time after the A/D converting section has performed sampling a given number of times.

4. The tracking control system of claim 1, further including a focus driving section for driving the lens in accordance with a focus shift value, wherein the CPU outputs the focus shift value for giving an instruction to move the lens to a first focus position at a distance from the optical disk smaller than an in-focus position and to a second focus position at a distance from the optical disk larger than the in-focus position, obtains the direct-current component of the differential phase tracking error signal at a position between the first and second focus positions as a balance value required due to an influence of a lens aberration, based on the direct-current components of the differential phase tracking error signal when the lens is at the first and second focus positions, respectively multiplies the product and the balance value required due to the influence of the lens aberration by respective given coefficients, and then sums these multiplication results, thereby outputting the sum as the balance value.

5. The tracking control system of claim 4, wherein the CPU respectively multiplies the product and the balance value required due to the influence of the lens aberration by one-half and then sums these multiplication results, thereby outputting the sum as the balance value.

6. The tracking control system of claim 1, wherein the balance correction amount calculating section obtains and outputs the balance correction amount by multiplying the conversion factor by a given constant during seek operation, and the tracking control section outputs the tracking control signal in accordance with the differential phase tracking error signal after balance change obtained during the seek operation, after the seek operation has been completed.

7. The tracking control system of claim 1, further including a focus driving section for driving the lens in accordance with a focus shift value, wherein the balance correction amount calculating section includes:

a program storing section for storing a program;

a CPU for executing the program, outputting the focus shift value for giving an instruction to move the lens to a first focus position at a distance from the optical disk smaller than an in-focus position and to a second focus position at a distance from the optical disk larger than the in-focus position, and obtaining the direct-current component of the differential phase tracking error signal at a position between the first and second focus positions based on the direct-current components of the differential phase tracking error signal when the lens is at the first and second focus positions, thereby outputting a value corresponding to the obtained direct-current component as a balance value; and a balance correction section for outputting the balance correction amount in accordance with the balance value.

8. The tracking control system of claim 1, wherein the balance correction amount calculating section detects the direct-current component of the differential amplitude tracking error signal during seek operation, and obtains and outputs the balance correction amount in accordance with the detected direct-current component of the differential amplitude tracking error signal, and the tracking control section outputs the tracking control signal in accordance with the differential phase tracking error signal after balance change obtained during the seek operation, after the seek operation has been completed.

9. The tracking control system of claim 1, further including an amplitude level changing section for changing an amplitude of the differential phase tracking error signal in accordance with a gain input, and outputting the obtained signal to the balance changing section, wherein the balance correction amount calculating section outputs the gain in accordance with an amplitude of the differential phase tracking error signal after balance change output from the balance changing section such that the amplitude has a given magnitude.

10. The tracking control system of claim 1, further including a defect detecting section for detecting a defect on the optical disk based on a reproduced signal detected by the optical pickup, and outputting a defect detection signal indicating whether there is a defect or not,
wherein the balance correction amount calculating section sets the balance correction amount at a given value when the defect detection signal indicates the presence of a defect.

11. The tracking control system of claim 1, further including a defect detecting section for detecting a defect on the optical disk based on a reproduced signal detected by the optical pickup, and outputting a defect detection signal indicating the presence of a defect,
wherein the balance correction amount calculating section holds the balance correction amount at a value before the detection of a defect when the defect detection signal indicates the presence of the defect.

12. The tracking control system of claim 1, including a plurality of semiconductor integrated circuits,
wherein one of the plurality of semiconductor integrated circuits includes the differential phase tracking error signal generating section, the differential amplitude tracking error signal generating section and the balance changing section, and
another one of the plurality of semiconductor integrated circuits includes the balance correction amount calculating section and the tracking control section.

13. A tracking control method for obtaining a tracking control signal for performing tracking control of an optical pickup including a plurality of light detecting sections each of which detects, via a lens, reflected light of a light beam applied to an optical disk, converts the detected light into an electric signal, and outputs the signal,
the tracking control method comprising:
a differential phase tracking error signal generating step of obtaining a differential phase tracking error signal based on a difference in phase between signals output from the plurality of light detecting sections;
a differential amplitude tracking error signal generating step of obtaining a differential amplitude tracking error signal based on a difference in value between signals output from the plurality of light detecting sections;
a balance correction amount calculating step of obtaining a direct-current component of the differential amplitude tracking error signal and obtaining a value by which the differential phase tracking error signal should be shifted as a balance correction amount in accordance with the direct-current component of the differential amplitude tracking error signal such that a direct-current component of the differential phase tracking error signal approaches a given reference potential;
a balance changing step of shifting the differential phase tracking error signal in accordance with the balance correction amount and obtaining the shifted signal as a differential phase tracking error signal after balance change, and
a tracking control step of obtaining the tracking control signal in accordance with the differential phase tracking error signal after balance change,
wherein the tracking control step outputs the tracking control signal such that the optical pickup is moved in accordance with a drive value shift signal output by the balance correction amount calculating step, and
the balance correction amount calculating step includes:
a program storing step for storing a program;
outputting the drive value shift signal for giving an instruction to move the optical pickup to a first tracking position closer to the outer edge of the optical disk than a position under tracking control and to a second tracking position closer to the inner edge of the optical disk than the position under tracking control, obtaining a value, as a conversion factor, by dividing a difference in the direct-current component of the differential phase tracking error signal between when the optical pickup is at the first tracking position and when the optical pickup is at the second tracking position by a difference in the direct-current component of the differential amplitude tracking error signal between when the optical pickup is at the first tracking position and when the optical pickup is at the second tracking position, and obtaining a value according to a product of the direct-current component of the differential amplitude tracking error signal and the conversion factor, thereby outputting the obtained value as a balance value; and
outputting the balance correction amount in accordance with the balance value.

* * * * *